(12) United States Patent
Fang et al.

(10) Patent No.: US 11,409,413 B2
(45) Date of Patent: *Aug. 9, 2022

(54) TECHNIQUES FOR GENERATING ELECTRONIC MENU GRAPHICAL USER INTERFACE LAYOUTS FOR USE IN CONNECTION WITH ELECTRONIC DEVICES

(71) Applicant: TouchTunes Music Corporation, New York, NY (US)

(72) Inventors: Yu Fang, Los Altos Hills, CA (US); Robert R. Dykes, Los Altos Hills, CA (US)

(73) Assignee: TOUCHTUNES MUSIC CORPORATION, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/003,020

(22) Filed: Aug. 26, 2020

(65) Prior Publication Data
US 2020/0387270 A1  Dec. 10, 2020

Related U.S. Application Data

(63) Continuation of application No. 15/924,816, filed on Mar. 19, 2018, now Pat. No. 10,761,686, which is a (Continued)

(51) Int. Cl.
*G06F 3/0482* (2013.01)
(52) U.S. Cl.
CPC .................. *G06F 3/0482* (2013.01)
(58) Field of Classification Search
CPC ..... G06F 3/0482; G06F 1/1688; G06F 3/0481
See application file for complete search history.

(56) References Cited

U.S. PATENT DOCUMENTS

| | | |
|---|---|---|
| 3,807,541 A | 4/1974 | Kortenhaus |
| 3,982,620 A | 9/1976 | Kotenhaus |

(Continued)

FOREIGN PATENT DOCUMENTS

| | | |
|---|---|---|
| AU | 199954012 | 4/2000 |
| CN | 1340939 | 3/2002 |

(Continued)

OTHER PUBLICATIONS

Search Report and Written Opinion dated Mar. 31, 2015 in corresponding International Application No. PCT/US2014/064637.

(Continued)

*Primary Examiner* — Cao H Nguyen
(74) *Attorney, Agent, or Firm* — Nixon & Vanderhye, PC

(57) ABSTRACT

Certain exemplary embodiments relate to techniques for generating electronic menu (eMenu) graphical user interface layouts for use in connection with electronic devices (e.g., tablets, phablets, smart phones, etc.). A virtual grid-based layout including rows and columns that together constitute regularly sized and shaped grid cells is defined. Input identifying items to be included in the eMenu is received. Each item has associated length and width dimensions corresponding to a number of grid cells. At least some of the items are flagged for inclusion in the eMenu. Those items marked for inclusion are automatically and programmatically arranged in the eMenu in the grid cells of the grid-based layout in a manner that minimizes the number of unused grid cells. A tag-based representation of the layout corresponding to the formatted eMenu is stored. The file is made available to the electronic device in enabling the formatted eMenu to be displayed thereon.

19 Claims, 11 Drawing Sheets

Related U.S. Application Data continuation of application No. 14/535,902, filed on Nov. 7, 2014, now Pat. No. 9,921,717.

(60) Provisional application No. 61/901,400, filed on Nov. 7, 2013.

(56) References Cited

U.S. PATENT DOCUMENTS

| | | |
|---|---|---|
| 4,008,369 A | 2/1977 | Theurer et al. |
| 4,186,438 A | 1/1980 | Benson |
| 4,232,295 A | 11/1980 | McConnell |
| 4,335,809 A | 6/1982 | Wain |
| 4,335,908 A | 6/1982 | Burge |
| 4,336,935 A | 6/1982 | Goldfarb |
| 4,356,509 A | 10/1982 | Skerlos et al. |
| 4,369,442 A | 1/1983 | Werth et al. |
| 4,375,287 A | 3/1983 | Smith |
| 4,412,292 A | 10/1983 | Sedam |
| 4,413,260 A | 11/1983 | Siegel et al. |
| 4,521,014 A | 6/1985 | Sitrick |
| 4,528,643 A | 7/1985 | Freeny |
| 4,558,413 A | 12/1985 | Schmidt et al. |
| 4,572,509 A | 2/1986 | Sitrick |
| 4,577,333 A | 3/1986 | Lewis et al. |
| 4,582,324 A | 4/1986 | Koza |
| 4,588,187 A | 5/1986 | Dell |
| 4,593,904 A | 6/1986 | Graves |
| 4,597,058 A | 6/1986 | Izumi |
| 4,636,951 A | 1/1987 | Harlick |
| 4,652,998 A | 3/1987 | Koza |
| 4,654,799 A | 3/1987 | Ogaki |
| 4,658,093 A | 4/1987 | Hellman |
| 4,667,802 A | 5/1987 | Verduin et al. |
| 4,674,055 A | 6/1987 | Ogaki et al. |
| 4,675,538 A | 6/1987 | Epstein |
| 4,677,311 A | 6/1987 | Morita |
| 4,677,565 A | 6/1987 | Ogaki |
| 4,703,465 A | 10/1987 | Parker |
| 4,704,725 A | 11/1987 | Harvey et al. |
| 4,707,804 A | 11/1987 | Leal |
| 4,722,053 A | 1/1988 | Dubno |
| 4,761,684 A | 8/1988 | Clark |
| 4,766,581 A | 8/1988 | Korn et al. |
| 4,787,050 A | 11/1988 | Suzuki |
| 4,792,849 A | 12/1988 | McCalley |
| 4,807,052 A | 2/1989 | Amano |
| 4,811,325 A | 3/1989 | Sharples |
| 4,814,972 A | 3/1989 | Winter et al. |
| 4,825,054 A | 4/1989 | Rust |
| 4,829,570 A | 5/1989 | Schotz |
| 4,852,154 A | 7/1989 | Lewis et al. |
| 4,857,714 A | 8/1989 | Sunyich |
| 4,868,832 A | 9/1989 | Marrington |
| 4,885,694 A | 12/1989 | Pray et al. |
| 4,905,279 A | 2/1990 | Nishio |
| 4,920,432 A | 4/1990 | Eggers |
| 4,922,420 A | 5/1990 | Nakagawa |
| 4,924,378 A | 5/1990 | Hershey |
| 4,926,485 A | 5/1990 | Yamashita |
| 4,937,807 A | 6/1990 | Weitz |
| 4,949,187 A | 8/1990 | Cohen |
| 4,953,159 A | 8/1990 | Hayden et al. |
| 4,956,768 A | 9/1990 | Sidi |
| 4,958,835 A | 9/1990 | Tashiro |
| 4,965,675 A | 10/1990 | Masashi et al. |
| 4,977,593 A | 12/1990 | Ballance |
| 4,999,806 A | 3/1991 | Chernow |
| 5,008,814 A | 4/1991 | Mathur |
| 5,012,121 A | 4/1991 | Hammond |
| 5,027,426 A | 6/1991 | Chiocca |
| 5,041,921 A | 8/1991 | Scheffler |
| 5,046,093 A | 9/1991 | Wachob |
| 5,053,758 A | 10/1991 | Cornett et al. |
| 5,058,089 A | 10/1991 | Yoshimara |
| 5,077,607 A | 12/1991 | Johnson et al. |
| 5,081,534 A | 1/1992 | Geiger et al. |
| 5,101,451 A | 3/1992 | Ash et al. |
| 5,101,499 A | 3/1992 | Streck et al. |
| 5,106,097 A | 4/1992 | Levine |
| 5,117,407 A | 5/1992 | Vogel |
| 5,128,862 A | 7/1992 | Mueller |
| 5,138,712 A | 8/1992 | Corbin |
| 5,148,159 A | 9/1992 | Clark et al. |
| 5,155,847 A | 10/1992 | Kirouac |
| 5,159,678 A | 10/1992 | Wengelski et al. |
| 5,163,131 A | 11/1992 | Row |
| 5,166,886 A | 11/1992 | Molnar |
| 5,172,413 A | 12/1992 | Bradley et al. |
| 5,180,309 A | 1/1993 | Egnor |
| 5,189,630 A | 2/1993 | Barstow et al. |
| 5,191,573 A | 3/1993 | Hair |
| 5,191,611 A | 3/1993 | Lang |
| 5,192,999 A | 3/1993 | Graczyk |
| 5,197,094 A | 3/1993 | Tillery |
| 5,203,028 A | 4/1993 | Shiraishi |
| 5,210,854 A | 5/1993 | Beaverton et al. |
| 5,214,761 A | 5/1993 | Barrett et al. |
| 5,222,134 A | 6/1993 | Waite et al. |
| 5,228,015 A | 7/1993 | Arbiter et al. |
| 5,231,157 A | 7/1993 | Herzig et al. |
| 5,237,157 A | 8/1993 | Kaplan |
| 5,237,322 A | 8/1993 | Heberle |
| 5,239,480 A | 8/1993 | Huegel |
| 5,250,747 A | 10/1993 | Tsumura |
| 5,252,775 A | 10/1993 | Urano |
| 5,260,999 A | 11/1993 | Wyman |
| 5,261,104 A | 11/1993 | Bertram et al. |
| 5,262,875 A | 11/1993 | Mincer et al. |
| 5,276,866 A | 1/1994 | Paolini |
| 5,278,904 A | 1/1994 | Servi |
| 5,282,028 A | 1/1994 | Johnson et al. |
| 5,289,476 A | 2/1994 | Johnson et al. |
| 5,289,546 A | 2/1994 | Hetherington |
| 5,315,161 A | 5/1994 | Robinson |
| 5,315,711 A | 5/1994 | Barone et al. |
| 5,319,455 A | 6/1994 | Hoarty et al. |
| 5,321,846 A | 6/1994 | Yokota et al. |
| 5,327,230 A | 7/1994 | Dockery |
| 5,335,313 A | 8/1994 | Douglas |
| 5,339,095 A | 8/1994 | Redford |
| 5,339,413 A | 8/1994 | Koval |
| 5,341,350 A | 8/1994 | Frank |
| 5,355,302 A | 10/1994 | Martin et al. |
| 5,357,276 A | 10/1994 | Banker |
| 5,369,778 A | 11/1994 | SanSoucie |
| 5,375,206 A | 12/1994 | Hunter |
| 5,386,251 A | 1/1995 | Movshovich |
| 5,389,950 A | 2/1995 | Bouton |
| 5,404,505 A | 4/1995 | Levinson |
| 5,406,634 A | 4/1995 | Anderson et al. |
| 5,408,417 A | 4/1995 | Wilder |
| 5,410,326 A | 4/1995 | Goldstein |
| 5,410,703 A | 4/1995 | Nilsson et al. |
| 5,418,713 A | 5/1995 | Allen |
| 5,420,923 A | 5/1995 | Beyers |
| 5,428,252 A | 6/1995 | Walker |
| 5,428,606 A | 6/1995 | Moskowitz |
| 5,431,492 A | 7/1995 | Rothschild |
| 5,440,632 A | 8/1995 | Bacon et al. |
| 5,444,499 A | 8/1995 | Saitoh |
| 5,445,295 A | 8/1995 | Brown |
| 5,455,619 A | 10/1995 | Truckenmiller et al. |
| 5,455,926 A | 10/1995 | Keele |
| 5,457,305 A | 10/1995 | Akel |
| 5,465,213 A | 11/1995 | Ross |
| 5,465,329 A | 11/1995 | Whistler |
| 5,467,326 A | 11/1995 | Miyashita et al. |
| 5,469,370 A | 11/1995 | Ostrover et al. |
| 5,469,573 A | 11/1995 | McGill et al. |
| 5,471,576 A | 11/1995 | Yee |
| 5,473,746 A | 12/1995 | Pritt et al. |
| 5,475,835 A | 12/1995 | Hickey |
| 5,481,509 A | 1/1996 | Knowles |
| 5,487,167 A | 1/1996 | Dinallo et al. |

(56) References Cited

U.S. PATENT DOCUMENTS

| | | |
|---|---|---|
| 5,489,103 A | 2/1996 | Okamoto |
| 5,495,610 A | 2/1996 | Shing |
| 5,496,178 A | 3/1996 | Back |
| 5,499,921 A | 3/1996 | Sone |
| 5,511,000 A | 4/1996 | Kaloi |
| 5,513,117 A | 4/1996 | Small |
| 5,515,173 A | 5/1996 | Mankovitz et al. |
| 5,519,435 A | 5/1996 | Anderson |
| 5,519,457 A | 5/1996 | Nishigaki et al. |
| 5,521,631 A | 5/1996 | Budow et al. |
| 5,521,918 A | 5/1996 | Kim |
| 5,521,922 A | 5/1996 | Fujinami et al. |
| 5,523,781 A | 6/1996 | Brusaw |
| 5,528,732 A | 6/1996 | Klotz |
| 5,532,734 A | 7/1996 | Goertz |
| 5,532,991 A | 7/1996 | Sasaki |
| 5,546,039 A | 8/1996 | Hewitt et al. |
| 5,548,729 A | 8/1996 | Akiyoshi |
| 5,550,577 A | 8/1996 | Verbiest |
| 5,554,968 A | 9/1996 | Lee |
| 5,555,244 A | 9/1996 | Gupta |
| 5,557,515 A | 9/1996 | Abbruzzese et al. |
| 5,557,541 A | 9/1996 | Schulhof |
| 5,557,724 A | 9/1996 | Sampat et al. |
| 5,559,505 A | 9/1996 | McNair |
| 5,559,549 A | 9/1996 | Hendricks |
| 5,559,714 A | 9/1996 | Banks et al. |
| 5,561,709 A | 10/1996 | Remillard |
| 5,565,908 A | 10/1996 | Ahmad |
| 5,566,237 A | 10/1996 | Dobbs |
| 5,570,363 A | 10/1996 | Holm |
| 5,578,999 A | 11/1996 | Matsuzawa et al. |
| 5,579,404 A | 11/1996 | Fielder et al. |
| 5,583,561 A | 12/1996 | Baker et al. |
| 5,583,937 A | 12/1996 | Ullrich et al. |
| 5,583,994 A | 12/1996 | Rangan |
| 5,583,995 A | 12/1996 | Gardner et al. |
| 5,592,482 A | 1/1997 | Abraham |
| 5,592,551 A | 1/1997 | Lett |
| 5,592,611 A | 1/1997 | Midgely et al. |
| 5,594,509 A | 1/1997 | Florin |
| 5,596,702 A | 1/1997 | Stucka et al. |
| 5,607,099 A | 3/1997 | Yeh et al. |
| 5,612,581 A | 3/1997 | Kageyama |
| 5,613,909 A | 3/1997 | Stelovsky |
| 5,616,876 A | 4/1997 | Gluts |
| 5,617,565 A | 4/1997 | Augenbraun et al. |
| 5,619,247 A | 4/1997 | Russo |
| 5,619,249 A | 4/1997 | Billock et al. |
| 5,619,250 A | 4/1997 | McClellan et al. |
| 5,619,698 A | 4/1997 | Lillich |
| 5,623,666 A | 4/1997 | Pike |
| 5,631,693 A | 5/1997 | Wunderlich et al. |
| 5,636,276 A | 6/1997 | Brugger |
| 5,638,426 A | 6/1997 | Lewis |
| 5,642,337 A | 6/1997 | Oskay et al. |
| 5,643,831 A | 7/1997 | Ochiai et al. |
| 5,644,714 A | 7/1997 | Kikinis |
| 5,644,766 A | 7/1997 | Coy |
| 5,654,714 A | 8/1997 | Takahashi et al. |
| 5,659,466 A | 8/1997 | Norris et al. |
| 5,661,517 A | 8/1997 | Budow et al. |
| 5,661,802 A | 8/1997 | Nilssen |
| 5,663,756 A | 9/1997 | Blahut et al. |
| 5,668,592 A | 9/1997 | Spaulding |
| 5,668,778 A | 9/1997 | Quazi |
| 5,668,788 A | 9/1997 | Allison |
| 5,675,734 A | 10/1997 | Hair |
| 5,680,533 A | 10/1997 | Yamato et al. |
| 5,684,716 A | 11/1997 | Freeman |
| 5,689,641 A | 11/1997 | Ludwig et al. |
| 5,691,778 A | 11/1997 | Song |
| 5,691,964 A | 11/1997 | Niederlein et al. |
| 5,696,914 A | 12/1997 | Nahaboo et al. |
| 5,697,844 A | 12/1997 | Von Kohorn |
| 5,703,795 A | 12/1997 | Mankowitz |
| 5,708,811 A | 1/1998 | Arendt |
| 5,712,976 A | 1/1998 | Falcon et al. |
| 5,713,024 A | 1/1998 | Halladay |
| 5,715,416 A | 2/1998 | Baker |
| 5,717,452 A | 2/1998 | Janin et al. |
| 5,721,583 A | 2/1998 | Harada et al. |
| 5,721,815 A | 2/1998 | Ottesen et al. |
| 5,721,827 A | 2/1998 | Logan et al. |
| 5,721,829 A | 2/1998 | Dunn et al. |
| 5,724,525 A | 3/1998 | Beyers et al. |
| 5,726,909 A | 3/1998 | Krikorian |
| 5,734,719 A | 3/1998 | Tsevdos et al. |
| 5,734,961 A | 3/1998 | Castille |
| 5,739,451 A | 4/1998 | Winksy et al. |
| 5,743,745 A | 4/1998 | Reintjes |
| 5,745,391 A | 4/1998 | Topor |
| 5,748,254 A | 5/1998 | Harrison et al. |
| 5,748,468 A | 5/1998 | Notenboom et al. |
| 5,748,954 A | 5/1998 | Mauldin |
| 5,751,336 A | 5/1998 | Aggarwal et al. |
| 5,752,232 A | 5/1998 | Basore et al. |
| 5,757,936 A | 5/1998 | Lee |
| 5,758,340 A | 5/1998 | Nail |
| 5,761,655 A | 6/1998 | Hoffman |
| 5,762,552 A | 6/1998 | Vuong |
| 5,774,527 A | 6/1998 | Handelman et al. |
| 5,774,668 A | 6/1998 | Choqiuer |
| 5,774,672 A | 6/1998 | Funahashi |
| 5,778,395 A | 7/1998 | Whiting |
| 5,781,889 A | 7/1998 | Martin et al. |
| 5,786,784 A | 7/1998 | Gaudichon |
| 5,790,172 A | 8/1998 | Imanaka |
| 5,790,671 A | 8/1998 | Cooper |
| 5,790,856 A | 8/1998 | Lillich |
| 5,790,935 A | 8/1998 | Payton |
| 5,793,364 A | 8/1998 | Bolanos et al. |
| 5,793,980 A | 8/1998 | Glaser |
| 5,798,785 A | 8/1998 | Hendricks |
| 5,802,283 A | 9/1998 | Grady et al. |
| 5,802,558 A | 9/1998 | Pierce |
| 5,802,599 A | 9/1998 | Cabrera |
| 5,805,804 A | 9/1998 | Laursen et al. |
| 5,808,224 A | 9/1998 | Kato |
| 5,809,246 A | 9/1998 | Goldman |
| 5,812,643 A | 9/1998 | Schelberg et al. |
| 5,815,146 A | 9/1998 | Youden et al. |
| 5,825,884 A | 10/1998 | Zdepski et al. |
| 5,828,343 A | 10/1998 | MacDonald et al. |
| 5,831,555 A | 11/1998 | Yu et al. |
| 5,831,663 A | 11/1998 | Waterhouse et al. |
| 5,832,024 A | 11/1998 | Schotz et al. |
| 5,832,287 A | 11/1998 | Atalla |
| 5,835,843 A | 11/1998 | Haddad |
| 5,842,869 A | 12/1998 | McGregor et al. |
| 5,845,104 A | 12/1998 | Rao |
| 5,845,256 A | 12/1998 | Pescitelli et al. |
| 5,848,398 A | 12/1998 | Martin |
| 5,851,149 A | 12/1998 | Xidos et al. |
| 5,854,887 A | 12/1998 | Kindell |
| 5,857,020 A | 1/1999 | Peterson |
| 5,857,707 A | 1/1999 | Devlin |
| 5,862,324 A | 1/1999 | Collins |
| 5,864,811 A | 1/1999 | Tran et al. |
| 5,864,868 A | 1/1999 | Contois |
| 5,864,870 A | 1/1999 | Guck |
| 5,867,714 A | 2/1999 | Todd |
| 5,870,721 A | 2/1999 | Norris |
| 5,880,386 A | 3/1999 | Wachi et al. |
| 5,880,769 A | 3/1999 | Nemirofsky et al. |
| 5,884,028 A | 3/1999 | Kindell |
| 5,884,298 A | 3/1999 | Smith |
| 5,887,139 A | 3/1999 | Madison, Jr. et al. |
| 5,887,193 A | 3/1999 | Takahashi |
| 5,893,162 A | 4/1999 | Lau et al. |
| 5,895,455 A | 4/1999 | Bellinger et al. |
| 5,896,094 A | 4/1999 | Narisada et al. |
| 5,903,266 A | 5/1999 | Berstis et al. |
| 5,913,040 A | 6/1999 | Rakavy |

(56) References Cited

U.S. PATENT DOCUMENTS

| | | |
|---|---|---|
| 5,914,712 A | 6/1999 | Sartain et al. |
| 5,915,094 A | 6/1999 | Kouloheris |
| 5,915,238 A | 6/1999 | Tjaden |
| 5,917,537 A | 6/1999 | Lightfoot |
| 5,917,835 A | 6/1999 | Barrett |
| 5,918,213 A | 6/1999 | Bernard et al. |
| 5,920,700 A | 7/1999 | Gordon et al. |
| 5,920,702 A | 7/1999 | Johnson |
| 5,923,885 A | 7/1999 | Johnson |
| 5,926,531 A | 7/1999 | Petite |
| 5,926,624 A | 7/1999 | Katz et al. |
| 5,930,765 A | 7/1999 | Martin |
| 5,931,908 A | 8/1999 | Gerba |
| 5,933,090 A | 8/1999 | Christenson |
| 5,940,504 A | 8/1999 | Griswold |
| 5,949,411 A | 9/1999 | Doerr et al. |
| 5,949,688 A | 9/1999 | Montoya |
| 5,953,429 A | 9/1999 | Wakai et al. |
| 5,956,716 A | 9/1999 | Kenner et al. |
| 5,959,869 A | 9/1999 | Miller |
| 5,959,945 A | 9/1999 | Kleiman |
| 5,960,167 A | 9/1999 | Roberts et al. |
| 5,963,916 A | 10/1999 | Kaplan |
| 5,966,495 A | 10/1999 | Takahashi |
| 5,970,467 A | 10/1999 | Alavi |
| 5,978,855 A | 11/1999 | Metz et al. |
| 5,978,912 A | 11/1999 | Rakavy et al. |
| 5,980,261 A | 11/1999 | Mino et al. |
| 5,999,499 A | 12/1999 | Pines et al. |
| 5,999,624 A | 12/1999 | Hopkins |
| 6,002,720 A | 12/1999 | Yurt |
| 6,005,599 A | 12/1999 | Asai et al. |
| 6,008,735 A | 12/1999 | Chiloyan et al. |
| 6,009,274 A | 12/1999 | Fletcher |
| 6,011,758 A | 1/2000 | Dockes et al. |
| 6,018,337 A | 1/2000 | Peters |
| 6,018,726 A | 1/2000 | Tsumura |
| 6,021,386 A | 2/2000 | Davis |
| 6,023,705 A | 2/2000 | Bellinger et al. |
| 6,025,868 A | 2/2000 | Russo |
| 6,034,925 A | 3/2000 | Wehmeyer |
| 6,038,591 A | 3/2000 | Wolfe et al. |
| 6,040,829 A | 3/2000 | Croy et al. |
| 6,041,354 A | 3/2000 | Biliris et al. |
| 6,049,891 A | 4/2000 | Inamoto |
| 6,054,987 A | 4/2000 | Richardson |
| 6,055,573 A | 4/2000 | Gardenswartz et al. |
| 6,057,874 A | 5/2000 | Michaud |
| 6,069,672 A | 5/2000 | Claassen |
| 6,072,982 A | 6/2000 | Haddad |
| 6,107,937 A | 8/2000 | Hamada |
| 6,118,450 A | 9/2000 | Proehl et al. |
| 6,124,804 A | 9/2000 | Kitao et al. |
| 6,131,088 A | 10/2000 | Hill |
| 6,131,121 A | 10/2000 | Mattaway et al. |
| 6,134,547 A | 10/2000 | Huxley et al. |
| 6,138,150 A | 10/2000 | Nichols et al. |
| 6,148,142 A | 11/2000 | Anderson |
| 6,151,077 A | 11/2000 | Vogel et al. |
| 6,151,634 A | 11/2000 | Glaser |
| 6,154,207 A | 11/2000 | Farris et al. |
| 6,157,935 A | 12/2000 | Tran et al. |
| 6,161,059 A | 12/2000 | Tedesco et al. |
| 6,167,358 A | 12/2000 | Othmer et al. |
| 6,170,060 B1 | 1/2001 | Mott et al. |
| 6,173,172 B1 | 1/2001 | Masuda et al. |
| 6,175,861 B1 | 1/2001 | Williams, Jr. et al. |
| 6,182,126 B1 | 1/2001 | Nathan et al. |
| 6,185,184 B1 | 2/2001 | Mattaway et al. |
| 6,185,619 B1 | 2/2001 | Joffe et al. |
| 6,191,780 B1 | 2/2001 | Martin et al. |
| 6,192,340 B1 | 2/2001 | Abecassis |
| 6,195,732 B1 | 2/2001 | Adams et al. |
| 6,198,408 B1 | 3/2001 | Cohen |
| 6,202,060 B1 | 3/2001 | Tran |
| 6,209,060 B1 | 3/2001 | Machida |
| 6,212,138 B1 | 4/2001 | Kalis et al. |
| 6,216,175 B1 | 4/2001 | Sliger et al. |
| 6,216,227 B1 | 4/2001 | Goldstein et al. |
| 6,219,692 B1 | 4/2001 | Stiles |
| 6,223,209 B1 | 4/2001 | Watson |
| 6,226,412 B1 | 5/2001 | Schwab |
| 6,226,715 B1 | 5/2001 | Van Der Wolf et al. |
| 6,240,550 B1 | 5/2001 | Nathan et al. |
| 6,243,725 B1 | 6/2001 | Hempleman et al. |
| 6,247,022 B1 | 6/2001 | Yankowski |
| 6,256,773 B1 | 7/2001 | Bowman-Amuah |
| 6,262,569 B1 | 7/2001 | Carr et al. |
| 6,280,327 B1 | 8/2001 | Leifer et al. |
| 6,282,709 B1 | 8/2001 | Reha et al. |
| 6,288,688 B1 | 9/2001 | Hughes et al. |
| 6,288,991 B1 | 9/2001 | Kajiyama et al. |
| 6,289,382 B1 | 9/2001 | Bowman-Amuah |
| 6,292,443 B1 | 9/2001 | Awazu et al. |
| 6,298,373 B1 | 10/2001 | Burns et al. |
| 6,301,710 B1 | 10/2001 | Fujiwara |
| 6,302,793 B1 | 10/2001 | Fertitta et al. |
| 6,308,204 B1 | 10/2001 | Nathan et al. |
| 6,311,214 B1 | 10/2001 | Rhoads |
| 6,315,572 B1 | 11/2001 | Glaser |
| 6,323,911 B1 | 11/2001 | Schein et al. |
| 6,332,025 B2 | 12/2001 | Takahashi et al. |
| 6,336,219 B1 | 1/2002 | Nathan |
| 6,341,166 B1 | 1/2002 | Basel |
| 6,344,862 B1 | 2/2002 | Williams et al. |
| 6,346,951 B1 | 2/2002 | Mastronardi |
| 6,353,820 B1 | 3/2002 | Edwards et al. |
| 6,356,971 B1 | 3/2002 | Katz et al. |
| 6,359,616 B1 | 3/2002 | Ogura et al. |
| 6,359,661 B1 | 3/2002 | Nickum |
| 6,370,580 B2 | 4/2002 | Kriegsman |
| 6,381,575 B1 | 4/2002 | Martin et al. |
| 6,384,737 B1 | 5/2002 | Hsu et al. |
| 6,393,584 B1 | 5/2002 | McLaren et al. |
| 6,396,480 B1 | 5/2002 | Schindler et al. |
| 6,397,189 B1 | 5/2002 | Martin et al. |
| 6,407,987 B1 | 6/2002 | Abraham |
| 6,408,435 B1 | 6/2002 | Sato |
| 6,408,437 B1 | 6/2002 | Hendricks et al. |
| 6,421,651 B1 | 7/2002 | Tedesco et al. |
| 6,425,125 B1 | 7/2002 | Fries et al. |
| 6,430,537 B1 | 8/2002 | Tedesco et al. |
| 6,430,738 B1 | 8/2002 | Gross et al. |
| 6,434,678 B1 | 8/2002 | Menzel |
| 6,438,450 B1 | 8/2002 | DiLorenzo |
| 6,442,549 B1 | 8/2002 | Schneider |
| 6,446,080 B1 | 9/2002 | Van Ryzin et al. |
| 6,446,130 B1 | 9/2002 | Grapes |
| 6,449,688 B1 | 9/2002 | Peters et al. |
| 6,470,496 B1 | 10/2002 | Kato et al. |
| 6,473,794 B1 | 10/2002 | Guheen et al. |
| 6,488,508 B2 | 12/2002 | Okamoto |
| 6,490,570 B1 | 12/2002 | Numaoka |
| 6,493,871 B1 | 12/2002 | McGuire et al. |
| 6,496,927 B1 | 12/2002 | McGrane et al. |
| 6,498,855 B1 | 12/2002 | Kokkosoulis et al. |
| 6,522,707 B1 | 2/2003 | Brandstetter et al. |
| 6,535,911 B1 | 3/2003 | Miller et al. |
| 6,538,558 B2 | 3/2003 | Sakazume et al. |
| 6,543,052 B1 | 4/2003 | Ogasawara |
| 6,544,122 B2 | 4/2003 | Araki et al. |
| 6,549,719 B2 | 4/2003 | Mankovitz |
| D475,029 S | 5/2003 | Nathan et al. |
| 6,560,651 B2 | 5/2003 | Katz et al. |
| 6,570,507 B1 | 5/2003 | Lee et al. |
| 6,571,282 B1 | 5/2003 | Bowman-Amuah |
| 6,577,735 B1 | 6/2003 | Bharat |
| 6,578,051 B1 | 6/2003 | Mastronardi et al. |
| 6,587,403 B1 | 7/2003 | Keller et al. |
| 6,590,838 B1 | 7/2003 | Gerlings et al. |
| 6,598,230 B1 | 7/2003 | Ballhorn |
| 6,622,307 B1 | 9/2003 | Ho |
| 6,628,939 B2 | 9/2003 | Paulsen |
| 6,629,318 B1 | 9/2003 | Radha et al. |

(56) References Cited

U.S. PATENT DOCUMENTS

| | | |
|---|---|---|
| 6,643,620 B1 | 11/2003 | Contolini et al. |
| 6,643,690 B2 | 11/2003 | Duursma et al. |
| 6,654,801 B2 | 11/2003 | Mann et al. |
| 6,658,090 B1 | 12/2003 | Harjunen et al. |
| 6,662,231 B1 | 12/2003 | Drosset et al. |
| 6,702,585 B2 | 3/2004 | Okamoto |
| 6,724,974 B2 | 4/2004 | Naruto et al. |
| 6,728,824 B1 | 4/2004 | Chen |
| 6,728,956 B2 | 4/2004 | Ono |
| 6,728,966 B1 | 4/2004 | Arsenault et al. |
| 6,744,882 B1 | 6/2004 | Gupta et al. |
| 6,751,794 B1 | 6/2004 | McCaleb et al. |
| 6,755,744 B1 | 6/2004 | Nathan et al. |
| 6,762,585 B2 | 7/2004 | Liao |
| 6,789,215 B1 | 9/2004 | Rupp et al. |
| 6,816,578 B1 | 11/2004 | Kredo et al. |
| 6,850,252 B1 | 2/2005 | Hoffberg |
| 6,898,161 B1 | 5/2005 | Nathan |
| 6,904,592 B1 | 6/2005 | Johnson |
| 6,920,614 B1 | 7/2005 | Schindler et al. |
| 6,928,653 B1 | 8/2005 | Ellis et al. |
| 6,934,700 B1 | 8/2005 | Ijdens et al. |
| 6,942,574 B1 | 9/2005 | LeMay et al. |
| 6,974,076 B1 | 12/2005 | Siegel |
| 7,024,485 B2 | 4/2006 | Dunning et al. |
| 7,073,172 B2 | 7/2006 | Chamberlain |
| 7,103,583 B1 | 9/2006 | Baum et al. |
| 7,107,109 B1 | 9/2006 | Nathan et al. |
| 7,111,129 B2 | 9/2006 | Percival |
| 7,114,013 B2 | 9/2006 | Bakke et al. |
| 7,124,194 B2 | 10/2006 | Nathan et al. |
| 7,181,458 B1 | 2/2007 | Higashi |
| 7,188,352 B2 | 3/2007 | Nathan et al. |
| 7,195,157 B2 | 3/2007 | Swartz et al. |
| 7,198,571 B2 | 4/2007 | LeMay et al. |
| 7,205,471 B2 | 4/2007 | Looney et al. |
| 7,206,417 B2 | 4/2007 | Nathan |
| 7,210,141 B1 | 4/2007 | Nathan et al. |
| 7,231,656 B1 | 6/2007 | Nathan |
| 7,237,198 B1 | 6/2007 | Chaney |
| 7,281,652 B2 | 10/2007 | Foss |
| 7,293,277 B1 | 11/2007 | Nathan |
| 7,356,831 B2 | 4/2008 | Nathan |
| 7,406,529 B2 | 7/2008 | Reed |
| 7,415,707 B2 | 8/2008 | Taguchi et al. |
| 7,418,474 B2 | 8/2008 | Schwab |
| 7,424,731 B1 | 9/2008 | Nathan et al. |
| 7,430,736 B2 | 9/2008 | Nguyen et al. |
| 7,433,832 B1 | 10/2008 | Bezos et al. |
| 7,448,057 B1 | 11/2008 | Nathan |
| 7,483,958 B1 | 1/2009 | Elabbady et al. |
| 7,500,192 B2 | 3/2009 | Mastronardi |
| 7,512,632 B2 | 3/2009 | Mastronardi et al. |
| 7,519,442 B2 | 4/2009 | Nathan et al. |
| 7,522,631 B1 | 4/2009 | Brown et al. |
| 7,533,182 B2 | 5/2009 | Wurtzel et al. |
| 7,549,919 B1 | 6/2009 | Nathan et al. |
| 7,574,727 B2 | 8/2009 | Nathan et al. |
| 7,647,613 B2 | 1/2010 | Drakoulis et al. |
| 7,657,910 B1 | 2/2010 | McAulay et al. |
| D616,414 S | 5/2010 | Nathan et al. |
| 7,749,083 B2 | 7/2010 | Nathan et al. |
| 7,757,264 B2 | 7/2010 | Nathan |
| 7,761,538 B2 | 7/2010 | Lin et al. |
| 7,770,165 B2 | 8/2010 | Olson et al. |
| 7,778,879 B2 | 8/2010 | Nathan et al. |
| 7,783,593 B2 | 8/2010 | Espino |
| 7,783,774 B2 | 8/2010 | Nathan et al. |
| 7,793,331 B2 | 9/2010 | Nathan et al. |
| 7,819,734 B2 | 10/2010 | Nathan et al. |
| 7,822,687 B2 | 10/2010 | Brillon et al. |
| D629,382 S | 12/2010 | Nathan et al. |
| D642,553 S | 8/2011 | Nathan et al. |
| 7,922,178 B2 | 8/2011 | Nathan et al. |
| 7,992,178 B1 | 8/2011 | Nathan et al. |
| 7,996,873 B1 | 8/2011 | Nathan et al. |
| 8,015,200 B2 | 9/2011 | Seiflien et al. |
| 8,028,318 B2 | 9/2011 | Nathan |
| 8,032,879 B2 | 10/2011 | Nathan et al. |
| 8,037,412 B2 | 10/2011 | Nathan et al. |
| 8,052,512 B2 | 11/2011 | Nathan et al. |
| 8,074,253 B1 | 12/2011 | Nathan |
| 8,103,589 B2 | 1/2012 | Nathan et al. |
| 8,151,304 B2 | 4/2012 | Nathan et al. |
| 8,165,318 B2 | 4/2012 | Nathan et al. |
| 8,189,819 B2 | 5/2012 | Nathan |
| 8,214,874 B2 | 7/2012 | Nathan |
| D665,375 S | 8/2012 | Garneau et al. |
| 8,292,712 B2 | 10/2012 | Nathan et al. |
| 8,332,895 B2 | 12/2012 | Nathan et al. |
| 8,429,530 B2 | 4/2013 | Neuman et al. |
| 8,661,477 B2 | 2/2014 | Nathan et al. |
| 9,177,314 B2 | 11/2015 | Uzo |
| 2001/0016815 A1 | 8/2001 | Takahashi et al. |
| 2001/0023403 A1 | 9/2001 | Martin et al. |
| 2001/0030660 A1 | 10/2001 | Zainoulline |
| 2001/0030912 A1 | 10/2001 | Kalis et al. |
| 2001/0037367 A1 | 11/2001 | Iyer |
| 2001/0044725 A1 | 11/2001 | Matsuda et al. |
| 2002/0002079 A1 | 1/2002 | Martin et al. |
| 2002/0002483 A1 | 1/2002 | Siegel et al. |
| 2002/0016968 A1 | 2/2002 | Nathan et al. |
| 2002/0113824 A1 | 8/2002 | Myers |
| 2002/0116476 A1 | 8/2002 | Eyal et al. |
| 2002/0118949 A1 | 8/2002 | Jones et al. |
| 2002/0120925 A1 | 8/2002 | Logan |
| 2002/0123331 A1 | 9/2002 | Lehaff et al. |
| 2002/0126141 A1 | 9/2002 | Mastronardi |
| 2002/0129036 A1 | 9/2002 | Ho Yuen Lok et al. |
| 2002/0162104 A1 | 10/2002 | Raike et al. |
| 2003/0004833 A1 | 1/2003 | Pollak et al. |
| 2003/0005099 A1 | 1/2003 | Sven et al. |
| 2003/0006911 A1 | 1/2003 | Smith et al. |
| 2003/0008703 A1 | 1/2003 | Gauselmann |
| 2003/0018740 A1 | 1/2003 | Sonoda et al. |
| 2003/0027120 A1 | 2/2003 | Jean |
| 2003/0031096 A1 | 2/2003 | Nathan et al. |
| 2003/0041093 A1 | 2/2003 | Yamane et al. |
| 2003/0065639 A1 | 4/2003 | Fiennes et al. |
| 2003/0076380 A1 | 4/2003 | Yusef et al. |
| 2003/0088538 A1 | 5/2003 | Ballard |
| 2003/0093790 A1 | 5/2003 | Logan et al. |
| 2003/0101450 A1 | 5/2003 | Davidsson et al. |
| 2003/0104865 A1 | 6/2003 | Itkis et al. |
| 2003/0108164 A1 | 6/2003 | Laurin et al. |
| 2003/0135424 A1 | 7/2003 | Davis et al. |
| 2003/0144910 A1 | 7/2003 | Flaherty et al. |
| 2003/0176218 A1 | 9/2003 | LeMay et al. |
| 2003/0191753 A1 | 10/2003 | Hoch |
| 2003/0208586 A1 | 11/2003 | Mastronardi et al. |
| 2003/0225834 A1 | 12/2003 | Lee et al. |
| 2004/0010800 A1 | 1/2004 | Goci |
| 2004/0025185 A1 | 2/2004 | Goci et al. |
| 2004/0085334 A1 | 5/2004 | Reaney |
| 2004/0103150 A1 | 5/2004 | Ogdon et al. |
| 2004/0145477 A1 | 7/2004 | Easter |
| 2004/0158555 A1 | 8/2004 | Seedman et al. |
| 2004/0204220 A1 | 10/2004 | Fried et al. |
| 2004/0205171 A1 | 10/2004 | Nathan et al. |
| 2004/0220926 A1 | 11/2004 | Lamkin et al. |
| 2005/0048816 A1 | 3/2005 | Higgins |
| 2005/0060405 A1 | 3/2005 | Nathan et al. |
| 2005/0073782 A1 | 4/2005 | Nathan |
| 2005/0086172 A1 | 4/2005 | Stefik |
| 2005/0111671 A1 | 5/2005 | Nathan |
| 2005/0125833 A1 | 6/2005 | Nathan et al. |
| 2005/0201254 A1 | 9/2005 | Looney et al. |
| 2005/0237321 A1* | 10/2005 | Young .............. G06F 9/451 345/418 |
| 2005/0267819 A1 | 12/2005 | Kaplan |
| 2006/0018208 A1 | 1/2006 | Nathan et al. |
| 2006/0031896 A1 | 2/2006 | Pulitzer |
| 2006/0035707 A1 | 2/2006 | Nguyen et al. |
| 2006/0062094 A1 | 3/2006 | Nathan et al. |

(56) References Cited

U.S. PATENT DOCUMENTS

| | | |
|---|---|---|
| 2006/0143575 A1 | 6/2006 | Sauermann |
| 2006/0227673 A1 | 10/2006 | Yamashita et al. |
| 2006/0239131 A1 | 10/2006 | Nathan et al. |
| 2006/0293773 A1 | 12/2006 | Nathan et al. |
| 2007/0025701 A1 | 2/2007 | Kawasaki et al. |
| 2007/0038727 A1* | 2/2007 | Bailey .................... G06Q 50/14 709/219 |
| 2007/0086280 A1 | 4/2007 | Cappello et al. |
| 2007/0121430 A1 | 5/2007 | Nathan |
| 2007/0139410 A1 | 6/2007 | Abe et al. |
| 2007/0142022 A1 | 6/2007 | Madonna et al. |
| 2007/0160224 A1 | 7/2007 | Nathan |
| 2007/0204263 A1 | 8/2007 | Nathan et al. |
| 2007/0209053 A1 | 9/2007 | Nathan |
| 2007/0220052 A1 | 9/2007 | Kudo et al. |
| 2007/0247979 A1 | 10/2007 | Brillon et al. |
| 2008/0065925 A1 | 3/2008 | Oliverio et al. |
| 2008/0066016 A1 | 3/2008 | Dowdy et al. |
| 2008/0069545 A1 | 3/2008 | Nathan et al. |
| 2008/0077962 A1 | 3/2008 | Nathan |
| 2008/0086379 A1 | 4/2008 | Dion et al. |
| 2008/0096659 A1 | 4/2008 | Kreloff et al. |
| 2008/0137849 A1 | 6/2008 | Nathan |
| 2008/0155588 A1 | 6/2008 | Roberts et al. |
| 2008/0168807 A1 | 7/2008 | Dion et al. |
| 2008/0171594 A1 | 7/2008 | Fedesna et al. |
| 2008/0195443 A1 | 8/2008 | Nathan et al. |
| 2008/0198271 A1 | 8/2008 | Malki |
| 2008/0222199 A1 | 9/2008 | Tiu et al. |
| 2008/0239887 A1 | 10/2008 | Tooker et al. |
| 2008/0243624 A1* | 10/2008 | Perry .................... G06F 1/1688 705/15 |
| 2008/0305738 A1 | 12/2008 | Khedouri et al. |
| 2009/0030802 A1 | 1/2009 | Plotnick et al. |
| 2009/0037969 A1 | 2/2009 | Nathan et al. |
| 2009/0042632 A1 | 2/2009 | Guenster et al. |
| 2009/0063976 A1 | 3/2009 | Bull et al. |
| 2009/0070341 A1 | 3/2009 | Mastronardi et al. |
| 2009/0091087 A1 | 4/2009 | Wasmund |
| 2009/0100092 A1 | 4/2009 | Seiflein et al. |
| 2009/0138111 A1 | 5/2009 | Mastronardi |
| 2009/0172565 A1 | 7/2009 | Jackson et al. |
| 2009/0177301 A1 | 7/2009 | Hayes |
| 2009/0241061 A1 | 9/2009 | Asai et al. |
| 2009/0265734 A1 | 10/2009 | Dion et al. |
| 2009/0282491 A1 | 11/2009 | Nathan |
| 2009/0287696 A1 | 11/2009 | Galuten |
| 2009/0307314 A1 | 12/2009 | Smith et al. |
| 2010/0042505 A1 | 2/2010 | Straus |
| 2010/0138780 A1 | 6/2010 | Marano |
| 2010/0211818 A1 | 8/2010 | Nathan et al. |
| 2010/0241259 A1 | 9/2010 | Nathan |
| 2010/0247081 A1 | 9/2010 | Victoria Pons |
| 2010/0269066 A1 | 10/2010 | Nathan |
| 2010/0299232 A1 | 11/2010 | Nathan et al. |
| 2011/0066943 A1 | 3/2011 | Brillon et al. |
| 2011/0191194 A1* | 8/2011 | Lutnick .............. G06Q 30/0641 705/15 |
| 2011/0246517 A1 | 10/2011 | Nathan et al. |
| 2011/0270894 A1 | 11/2011 | Mastronardi et al. |
| 2011/0283236 A1 | 11/2011 | Beaumier et al. |
| 2011/0321026 A1 | 12/2011 | Nathan et al. |
| 2012/0009985 A1 | 1/2012 | Nathan et al. |
| 2012/0053713 A1 | 3/2012 | Nathan |
| 2012/0105464 A1 | 5/2012 | Franceus |
| 2012/0143732 A1 | 6/2012 | Nathan et al. |
| 2012/0150614 A1 | 6/2012 | Dion et al. |
| 2012/0158531 A1 | 6/2012 | Dion et al. |
| 2012/0166965 A1 | 6/2012 | Nathan et al. |
| 2012/0240140 A1 | 9/2012 | Nathan |
| 2012/0284196 A1 | 11/2012 | Vilmos |
| 2012/0323652 A1 | 12/2012 | Mastronardi et al. |
| 2013/0021281 A1 | 1/2013 | Tse et al. |
| 2013/0040715 A1 | 2/2013 | Nathan et al. |
| 2013/0044995 A1 | 2/2013 | Cappello et al. |
| 2013/0070093 A1 | 3/2013 | Rivera et al. |
| 2013/0091054 A1 | 4/2013 | Nathan et al. |
| 2013/0239049 A1* | 9/2013 | Perrodin .............. G06F 3/0481 715/800 |
| 2014/0026154 A1 | 1/2014 | Nathan |
| 2014/0089183 A1 | 3/2014 | Allen |
| 2014/0114775 A1 | 4/2014 | Cloin |
| 2016/0078434 A1 | 3/2016 | Huxham |

FOREIGN PATENT DOCUMENTS

| | | |
|---|---|---|
| DE | 3406058 | 8/1985 |
| DE | 3723737 | 1/1988 |
| DE | 3820835 | 1/1989 |
| DE | 3815071 | 11/1989 |
| DE | 4244198 | 6/1994 |
| DE | 19539172 | 9/1996 |
| DE | 19610739 | 9/1997 |
| DE | 19904007 | 8/2000 |
| EP | 0082077 | 6/1983 |
| EP | 0140593 | 5/1985 |
| EP | 0256921 | 2/1988 |
| EP | 0283304 | 9/1988 |
| EP | 0283350 | 9/1988 |
| EP | 0309298 | 3/1989 |
| EP | 0313359 | 4/1989 |
| EP | 0340787 | 11/1989 |
| EP | 0363186 | 4/1990 |
| EP | 0425168 | 5/1991 |
| EP | 0464562 | 1/1992 |
| EP | 0480558 | 4/1992 |
| EP | 0498130 | 8/1992 |
| EP | 0507110 | 10/1992 |
| EP | 0529834 | 3/1993 |
| EP | 0538319 | 4/1993 |
| EP | 0631283 | 12/1994 |
| EP | 0632371 | 1/1995 |
| EP | 0711076 | 5/1996 |
| EP | 0786122 | 7/1997 |
| EP | 0817103 | 1/1998 |
| EP | 0841616 | 5/1998 |
| EP | 0919964 | 6/1999 |
| EP | 0959570 | 11/1999 |
| EP | 0974896 | 1/2000 |
| EP | 0974941 | 1/2000 |
| EP | 0982695 | 3/2000 |
| EP | 1001391 | 5/2000 |
| EP | 1170951 | 1/2002 |
| EP | 1288802 | 3/2003 |
| EP | 1408427 | 4/2004 |
| EP | 1549919 | 4/2004 |
| EP | 1962251 | 8/2008 |
| FR | 2602352 | 2/1988 |
| FR | 2808906 | 11/2001 |
| GB | 2122799 | 1/1984 |
| GB | 2166328 | 4/1986 |
| GB | 2170943 | 8/1986 |
| GB | 2193420 | 2/1988 |
| GB | 2238680 | 6/1991 |
| GB | 2254469 | 10/1992 |
| GB | 2259398 | 3/1993 |
| GB | 2262170 | 6/1993 |
| GB | 2380377 | 4/2003 |
| GB | 2505584 | 8/2014 |
| JP | 57173207 | 10/1982 |
| JP | 58-179892 | 10/1983 |
| JP | 60-253082 | 12/1985 |
| JP | 61084143 | 4/1986 |
| JP | 62-192849 | 8/1987 |
| JP | 62-284496 | 12/1987 |
| JP | 63-60634 | 3/1988 |
| JP | 2-153665 | 6/1990 |
| JP | 5-74078 | 3/1993 |
| JP | 5122282 | 5/1993 |
| JP | WO 93/18465 | 9/1993 |
| JP | 07281682 | 10/1995 |
| JP | 07-311587 | 11/1995 |
| JP | 8274812 | 10/1996 |
| JP | 08279235 | 10/1996 |

(56) References Cited

FOREIGN PATENT DOCUMENTS

| | | |
|---|---|---|
| JP | 08289976 | 11/1996 |
| JP | 928918 | 2/1997 |
| JP | 9114470 | 5/1997 |
| JP | 9127964 | 5/1997 |
| JP | 09-244900 | 9/1997 |
| JP | 10-098344 | 4/1998 |
| JP | 10-222537 | 8/1998 |
| JP | 11-003088 | 1/1999 |
| JP | 11-024686 | 1/1999 |
| JP | 11-095768 | 4/1999 |
| JP | 2002-83640 | 3/2002 |
| JP | 2002-537584 | 11/2002 |
| JP | 2003-076380 | 3/2003 |
| JP | 2003-084903 | 3/2003 |
| JP | 2003-099072 | 4/2003 |
| JP | WO 2004/029775 | 4/2004 |
| JP | 2005-107267 | 4/2005 |
| JP | 2005-184237 | 7/2005 |
| JP | 2006-048076 | 2/2006 |
| JP | 2007-034253 | 2/2007 |
| JP | 2007-041722 | 2/2007 |
| JP | 2007/505410 | 3/2007 |
| JP | 07504517 | 3/2007 |
| JP | 2007-102982 | 4/2007 |
| JP | 2007-104072 | 4/2007 |
| JP | 2007-128609 | 5/2007 |
| JP | 2007-164078 | 6/2007 |
| JP | 2007-164298 | 6/2007 |
| JP | 2007/179333 | 7/2007 |
| JP | 2007-241748 | 9/2007 |
| JP | 2008-058656 | 3/2008 |
| JP | 2009-017529 | 1/2009 |
| JP | 2009-075540 | 4/2009 |
| WO | WO 86/01326 | 2/1986 |
| WO | WO 90/00429 | 1/1990 |
| WO | WO 90/07843 | 7/1990 |
| WO | WO 91/08542 | 6/1991 |
| WO | WO 91/20082 | 12/1991 |
| WO | WO 93/16557 | 8/1993 |
| WO | WO93/021732 | 10/1993 |
| WO | WO 94/03894 | 2/1994 |
| WO | WO 94/14273 | 6/1994 |
| WO | WO 94/15306 | 7/1994 |
| WO | WO 94/15416 | 7/1994 |
| WO | WO 95/03609 | 2/1995 |
| WO | WO 95/29537 | 11/1995 |
| WO | WO 96/12255 | 4/1996 |
| WO | WO 96/12256 | 4/1996 |
| WO | WO 96/12257 | 4/1996 |
| WO | WO 96/12258 | 4/1996 |
| WO | WO 98/07940 | 2/1998 |
| WO | WO 98/11487 | 3/1998 |
| WO | WO 98/45835 | 10/1998 |
| WO | WO 99/35753 | 7/1999 |
| WO | WO 01/00290 | 1/2001 |
| WO | WO 01/08148 | 2/2001 |
| WO | WO 01/71608 | 9/2001 |
| WO | WO 02/060546 | 8/2002 |
| WO | WO 02/095752 | 11/2002 |
| WO | WO 01/084353 | 1/2003 |
| WO | WO 03/069613 | 8/2003 |
| WO | WO 2005/026916 | 3/2005 |
| WO | WO 2006/014739 | 2/2006 |
| WO | WO 2006/056933 | 6/2006 |
| WO | WO 2007/092542 | 8/2007 |
| WO | WO 2008-033853 | 3/2008 |
| WO | WO 2011094330 | 8/2011 |
| WO | WO 2013/040603 | 3/2013 |

OTHER PUBLICATIONS

International Preliminary Report for International Application No. PCT/US2014/064637 dated May 19, 2016.
Office Action in related application U.S. Appl. No. 14/481,761 dated Oct. 11, 2017.
Office Action in related application U.S. Appl. No. 15/098,871 dated Aug. 22, 2017.
"About Ecast", date unknown, leaflet.
Ahanger et al.; A Digital On-Demand Video Service Supporting Content-Based Queries; 1993; 9 pages.
Austin Cyber Limits: Name That Tune [online], [retrieved Jul. 23, 2001]. Retrieved from the Internet: <http://www.pbs.ork/klru/austin/games/namethattune.html>.
Back to the Tunes [online], [retrieved Jul. 23, 2001]. Retrieved from the Internet: <http://citc5.hispeed.com/rules.html>.
Bonczek et al., "The DSS Development System", 1983 National Computer Conference, Anaheim, California, May 16-19, 1983, pp. 441-455.
Chan et al., "Distributed servers architectures for networked video services", IEEE Trans on Networking, vol. 9, No. 2, pp. 125-136, 2001.
Chen et al., "Optimization of the grouped sweeping scheduling (GSS) with heterogeneous multimedia streams", ACM Multimedia, pp. 1-7, 1993.
Crutcher et al., "The networked video Jukebox", IEEE, Trans. on circuits and systems for video technology, vol. 4, No. 2, pp. 105-120, 1994.
"Darts Revolution Again", Replay Magazine, Mar. 1991, pp. 146-148.
Derfler et al., "How Networks Work", Millennium Ed., Que Corporation, Jan. 2000.
Drews, C.; Pestoni, F.; "Virtual jukebox: reviving a classic," Proceedings of the 35th Annual Hawaii International Conference System Sciences, pp. 887-893, Jan. 7-10 2002.
"Ecast Forges Landmark International Technology Partnership", Business Wire at www.findarticles.com/cf_0/m0EIN/2000_July_25/63663604/print.html, 2 pages, Jul. 25, 2000.
"Ecast Selects Viant to Build Siren Entertainment System (TM)", ScreamingMedia, PR Newswire San Francisco, industry.java.sum.com/javanews/stories/story2/0,1072,17618,00.html, 3 pages, Aug. 3, 1999.
Fachbuch, "Unterhaltungselektronic von A-Z" gfu 1, VDE-Verlag GmbH, pp. 12-13, 1983-1984.
"Foobar 2000 Evaluation Updated," MonkeyBiz, Aug. 3, 2000, 4 pages (with partial English translation). http://monkeybizinfo.blogspot.jp/2008/08/foobar2000.html.
Gallardo et al., "Tangible Jukebox: back to palpable music", ACM TEI, pp. 199-202, 2010.
Gralla, "How the Internet Works", Millennium Ed., Que Corporation, Aug. 1999.
Grimes, Chapter 18, "Taking Advantage of Web-based Audio".
Hewlett-Packard Development Co; HP Open View Storage Data Protector Admin's Guideline Manual Edition; May 2003; Copyright 2003, 60 pages https://h20000.www2.hp.com/bc/docs/support/SupportManual/c006637931/c00663793.pdf.
Hicks et al., "Dynamic software updating", ACM PLDI, pp. 13-23, 2001.
IBM Technical Disclosure Bulletin, vol. 30, No. 5, Oct. 1987, "Method for Automated Assembly of Software Versions", pp. 353-355.
IBM Technical Disclosure Bulletin, vol. 32, No. 9A, Feb. 1990, "Robotic Wafer Handling System for Class 10 Environments" pp. 141-143.
IBM Technical Disclosure Bulletin, vol. 33, No. 12, May 1991, "High-speed Opens and Shorts Substrate Tester", pp. 251-259.
IBM Technical Disclosure Bulletin, vol. 41, No. 1, Jan. 1998, "Safe Mechanism for Installing Operating System Updates with Applications," pp. 557-559.
ITouch 8 Plus brochure, JVL Corporation, 2005, 2 pages.
ITouch 27 New Games brochure, JVL Corporation, 2005, 2 pages.
Johnny Rockets Name That Tune [online], [retrieved Mar. 7, 2002]. Retrieved from the Internet: <http://www.johnnyrockets.com/docs/funstuff.html>.
Koskelainem, "Report on Streamworks™".
Kozierok, The PC Guide, Site Version 2.2.0, https://www.pcguide.com, Apr. 17, 2001.

(56) References Cited

OTHER PUBLICATIONS

Kraiss et al., "Integrated document caching and prefetching in storage hierarchies based on Markov chain predictions", The VLDB Journal, vol. 7, issue 3, pp. 141-162, 1998.
Liang et al., "Dynamic class loading in the Java virtual machine", ACM OOPSLA, pp. 36-44, 1998.
Look and iTouch brochure, JVL Corporation, 2004, 2 pages.
Ludescher et al., "File Storage Management for TFTF physics data", IEEE, pp. 856-859, 1992.
Megatouch Champ brochure, Merit Industries, Inc., 2005, 2 pages.
Melnik et al., "A mediation infrastructure for digital library services", ACM DL, pp. 123-132, 2000.
Merriam Webster's Collegiate Dictionary, Tenth Edition, Merriam-Webster, Inc., p. 361 (definition of dynamically).
Mickey B's Jukebox Revue—Name That Tune! [online], Retrieved from the Internet: <http://mickeyb.com/tune/>.
Mod Box Internet brochure, Merit Entertainment, 2006, 2 pages.
Newsome et al., "Proxy compilation of dynamically loaded java classes with MoJo", ACM LCTES, pp. 204-212, Jun. 2002.
Outlaw, Computer Technology Review, "Virtual Servers Offer Performance Benefits for Network Imaging", 1993.
Patent Abstract of Japan vol. 95, No. 010 & JP 07 281682 A (Naguo Yuasa), 27 Oct. 1 JP 07 281682, figure 1-6 abrége.
Peter Pawlowski, "Basic Player Whose Appearance and Functions can be Customized Freely 'Foobar 2000' v1.0 is Unveiled,"Windows Forest, Japan, Jan. 12, 2010, 3 pages (with partial English translation). http://forest.impress.co.jp/docs/news/20100112_341870.html.
Pohlmann, "Principles of Digital Audio", Third Edition, 1995.
PR Newswire, Press Release, "MusicMatch Announces Commerical Availability of Meta Trust Certified MusicMatch jukebox", New York; Nov. 15, 1999, extracted from Internet, http://proquest.umi.com on Sep. 17, 2002.
Rollins et al., "Pixie: A jukebox architecture to support efficient peer content exchange", ACM Multimedia, pp. 179-188, 2002.
Schneier, "Applied Cryptography", Second Edition, John Wiley & Sons, Inc. New York, 1996.
Sprague et al., "Music selection using the partyvote democratic Jukebox", ACM AVI, pp. 433-436, 2008.
Stevens, "TCP/IP Illustrated: vol. 1, the Protocols".
Stewart, "Ecast Deploys Marimba's Castanet to Power an Internet-Based, Entertainment Management System forthe Out-of-Home Market", Marimba, Press Release, 3 pages, www.marimba.com/news/releases/ecast.dec13.html, Dec. 13, 1999.
Strauss et al., "Information Jukebox A semi public device for presenting multimedia information content", Pers. Ubiquit Comput, 7, pp. 217-220, 2003.
Tom & Liz's Name That Tune [online], [retrieved Jul. 23, 2001]. Retrieved from the Internet: <http://home.att.net/~tomnliz/Music.html>.
Vortex Brochure, JVL Corporation, 2005, 2 pages.
Waingrow, "Unix Hints & Hacks", Que Corporation, Indianapolis, IN, 1999.
White, "How Computers Work", Millennium Ed., Que Corporation, Indianapolis, IN, Sep. 1999 (Sep. 22, 1999).
Yuki Murata, iTunes no 'Kanky Settei' Catalog & Tips 10 Sen, Mac People, ASCII Corporation, Oct. 1, 2007.

\* cited by examiner

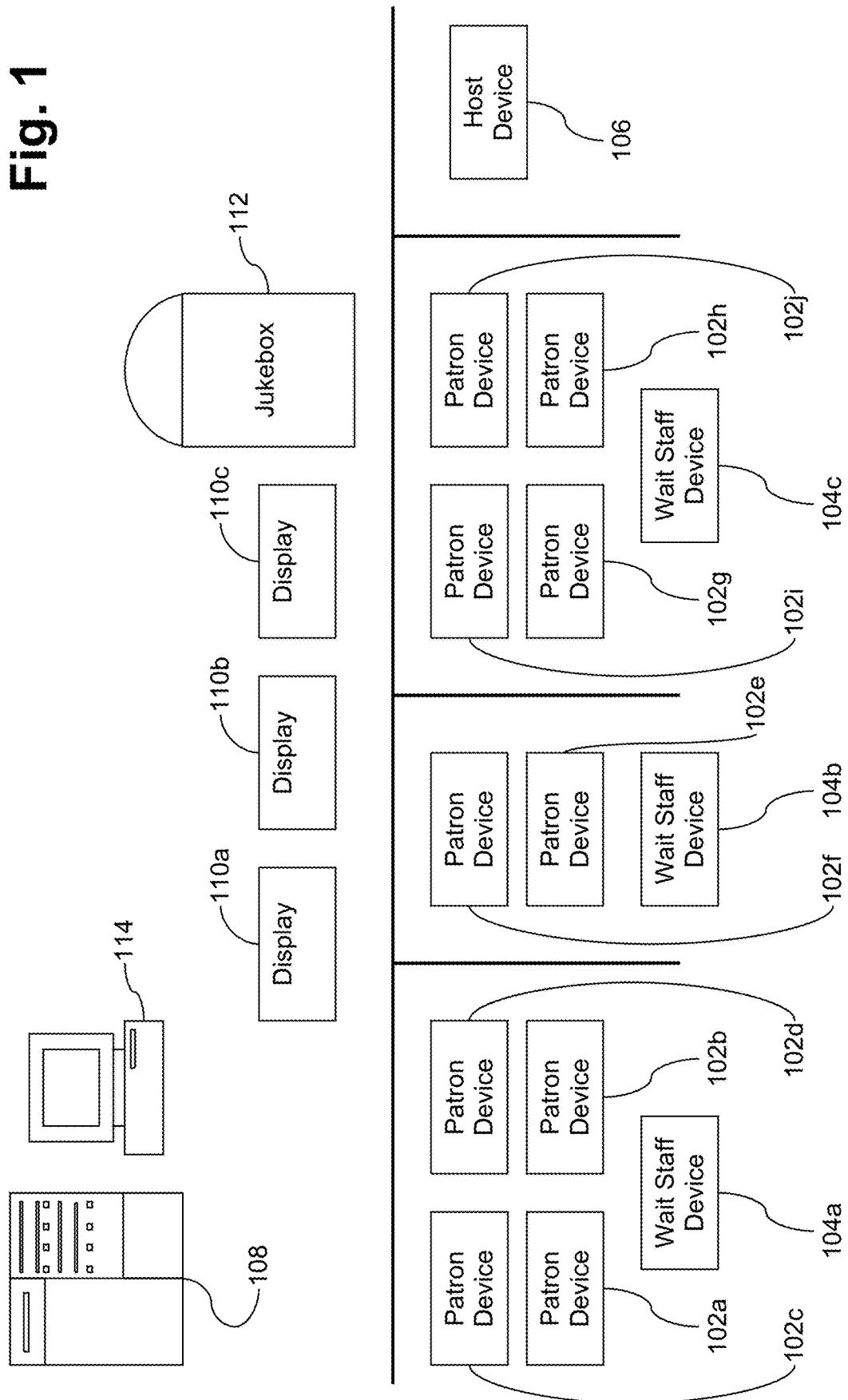

| Category | Name | Description | Full Image URL | Publish | Items In Stock | Available Days | Special | Start time | End time | Price Description | Price | Price Description | Price |
|---|---|---|---|---|---|---|---|---|---|---|---|---|---|
| Appetizers | Fried Pickles | Delicious dill pickles are batter dipped and fried until golden brown. Served with a savory mustard-based dipping sauce. | | yes | 10 | | no | | | | 7.99 | | |
| Wings | Boneless Wings | Chicken tenders with your choice of our zesty BBQ sauce or honey mustard dipping sauce. | /products/2012wings-03244.png | yes | 10 | | no | | | 6 | 7.99 | 12 | 10.99 |
| Entrees | Chicken Tenders Platter | Tender, shaved, and grilled roast beef served with grilled onions on our delicious Kummelweck roll topped with sea salt. | | | 10 | | | | | | 12.49 | | |
| Sandwiches | Beef O Weck | Crisp, chilled romaine lettuce tossed with our Caesar dressing, oven-baked croutons. | /products/newbeefonweck-6.png | yes | 10 | | no | | | | 9.99 | | |
| Salads Classic | Grilled Salmon Caesar Salad | Our award-winning burger grilled to perfection. | | yes | 10 | | no | | | | 13.99 | | |
| Burgers | All American Burger | | | yes | 10 | | no | | | | 7.99 | | |
| Sides | Seasoned Fries | | | yes | 10 | | no | | | | 2.69 | | |
| Sidelines | Cornbread with Butter | Moist and sinfully delicious chocolate cake with a molten chocolate center. Served warm with premium vanilla ice cream. | | yes | 10 | | no | | | | 3.99 | | |
| Desserts | Warm Chocolate Lava Cake | | /products/lavacake-136.png | yes | 10 | | no | | | | 5.99 | | |

Fig. 6

| CATEGORY | NAME | DESCRIPTION | Image URL | Special | Featured | Start time | End time | Price Description | Price | Price Description | Price | Price Description | Price |
|---|---|---|---|---|---|---|---|---|---|---|---|---|---|
| Classic Cocktails | Top Shelf Long Island Iced Tea | Made with Kettle One Vodka, Bacardi Superior Rum, Tanqueray Gin and Cointreau. | /drinks/ltir.jpg | no | no | | | | | | | | |
| Bottled Beer | Michelob Ultra 4.2% | | | no | no | | | | | | | | |
| Bottled Beer | Coors Light 4.2% | | | no | no | | | | | | | | |
| Draft Beer | Guinness 4.2% | | /drinks/guinness.jpg | no | no | | | | | | | | |
| Draft Beer | Bud Light 4.2% | | | no | no | | | | | | | | |
| Wine List | White | Sauvignon Blanc - Starborough, NZ | | | no | no | | | Glass | 7.99 | Bottle | 24.49 | | |
| Wine List | Red | Malbec - Alamos, Argentina | | | no | no | | | | | | | | |
| Margaritas & Frozen Drinks | Frozen Strawberry Margarita | Our Home Run Margarita blended with strawberry puree and served frozen with a sugar rim. | | no | yes | | | | | | | | |
| Margaritas & Frozen Drinks | Strawberry Daiquiri | Your choice of rum blended with strawberry puree. | /drinks/daiquiri.jpg | no | no | | | | | | | | |
| Margaritas & Frozen Drinks | Piña Colada | Pineapple and coconut blended with your choice of rum. | | no | no | | | | | | | | |
| Non-Alcoholic | Raspberry Iced Tea | | | no | no | | | EACH | 3.59 | REFILLS | 0.99 | | |
| Non-Alcoholic | Peach Iced Tea | | | no | no | | | EACH | 3.59 | REFILLS | 0.99 | | |

Fig. 7

TECHNIQUES FOR GENERATING ELECTRONIC MENU GRAPHICAL USER INTERFACE LAYOUTS FOR USE IN CONNECTION WITH ELECTRONIC DEVICES

This application is a continuation of U.S. application Ser. No. 15/924,816 which is a continuation of U.S. application Ser. No. 14/535,902 filed Nov. 7, 2014 now U.S. Pat. No. 9,921,717 issued Mar. 20, 2018, which claims the benefit of U.S. Provisional Application No. 61/901,400, filed on Nov. 7, 2013, the entire contents of which are hereby incorporated by reference herein.

TECHNICAL FIELD

Certain exemplary embodiments relate to techniques for generating electronic menu (eMenu) graphical user interface (GUI) layouts for use in connection with electronic devices such as, for example, tablets, phablets, smart phones, and/or other electronic devices.

BACKGROUND AND SUMMARY

Electronic menus (eMenus) are becoming more and more popular, especially as prices for electronic devices such as tablets, phablets, smart phones, and the like, continue to drop. Some restaurants thus have made moves to make their current physical menus available via custom applications (apps) that run on such electronic devices.

Unfortunately, however, the process of turning a physical "paper" or other menu into an electronic version can be complicated. For instance, although patrons typically tolerate a large amount of so-called "negative space" (e.g., large areas of unused or "wasted" space where a simple white or other oftentimes neutral color background appears behind text and/or images) when it comes to physical "paper" or other menus, electronic device users typically want to have more visually interesting "worlds" in which they can navigate and explore. Thus, a simple conversion from a paper menu to an electronic version, without more, can result in a graphical user interface (GUI) that is generally unsuitable for an electronic device because of the presence of too much "boring" negative space. As another example, although it is relatively easy to flip through a multi-page physical menu, navigating through a simple electronic analog (e.g., via scrolling or the like) could be quite tedious. Even where "electronic pages" can be "turned" by a user operating an electronic device, simply listing menu items through a series of text entries still leaves a large amount of wasted negative space and can create a fairly boring user experience. Thus, although the content may remain the same as between a conventional physical menu and an eMenu, it may be desirable to change the form of the information, e.g., to make it more appropriate for the device being used.

The process of generating an eMenu may also require special programming expertise that a restaurateur may not possess. Menu creation therefore may be difficult from a technical standpoint. Even in situations where restaurateurs are able to create eMenus, the process of laying out an eMenu for electronic device can be quite different from laying out a paper menu, and may involve a different skill set, e.g., as digital creation is different from paper layout presentation. It is fairly rare to find a person who has both technical programming skills and "an eye" for how graphics and/or other layout approaches can enhance how menus and/or menu items are presented. It thus will be appreciated that it would be desirable to help merge the content creation and formatting processes, e.g., to create an accessible, cohesive, and visually interesting eMenu.

Hardcoded eMenu solutions tend to be costly and promote stagnation of menus, e.g., as the customizations and updates generally carry further costs. In such cases, it oftentimes is difficult to highlight "featured" menu items that change on a daily, weekly, monthly, or other basis. It also can be difficult to remove entries that are no longer offered. Considering that a restaurateur could easily provide a "menu insert" to highlight featured menu items or "line through" or otherwise delete and reprint no longer offered items when working in the physical (e.g., paper) world, current eMenuing systems in some senses actually create new challenges. This is an interesting trend, as most people view technology as an expedient for pushing out new content quickly and easily. It thus will be appreciated that it would be desirable to provide approaches that help keep menus fresh and up to date, both in terms of their content and their look-and-feel.

Certain exemplary embodiments address these and/or other issues, e.g., by providing techniques for more automated eMenu generation and/or management. In certain example embodiments, a method of formatting an electronic menu to be output to a display of an electronic device is provided. There is defined a virtual grid-based layout including rows and columns that together define a plurality of regularly sized and shaped grid cells. Input identifying a plurality of items to be included in the electronic menu is received, with each said item having associated length and width dimensions corresponding to a number of grid cells, and with at least some of said items being flagged for inclusion in the electronic menu. Those items marked for inclusion in the electronic menu are automatically and programmatically arranged in the grid cells of the grid-based layout in a manner that minimizes the number of unused grid cells. A tag-based representation of the layout is stored to a file on a non-transitory computer readable storage medium, following said arranging, with the tag-based representation of the layout corresponding to the formatted electronic menu. The file is made available to the electronic device in enabling the formatted electronic menu to be displayed on the display of the electronic device.

In certain example embodiments, a method of formatting an electronic menu to be output to a display of an electronic device is provided. There is defined a virtual grid-based layout including rows and columns that together define a plurality of regularly sized and shaped grid cells. Input from a predefined file corresponding to a physical menu is received, with the received input identifying a plurality of items to be included in the electronic menu, with each said item having associated length and width dimensions corresponding to a number of grid cells, and with at least some of said items being flagged for inclusion in the electronic menu.

Using at least one processor of a computing system, those items marked for inclusion in the electronic menu are automatically and programmatically virtually arranged in the grid cells of the grid-based layout in a manner that minimizes the number of unused grid cells. A representation of the layout is stored to a file on a non-transitory computer readable storage medium of the computing system following said arranging, with the representation of the layout corresponding to the formatted electronic menu. The file is published so that the file is made available over a network interface of the computing device to the electronic device in enabling the formatted electronic menu to be displayed on the display of the electronic device.

In certain example embodiments, a computing device is provided. The computing device includes processing resources including at least one processor and a memory; a non-transitory computer readable storage medium; and an input channel configured to receive input identifying a plurality of items to be included in an electronic menu, each said item having associated length and width dimensions corresponding to a number of grid cells, at least some of said items being flagged for inclusion in the electronic menu. The processing resources are controllable to format the electronic menu using received input by executing instructions for at least: defining a virtual grid-based layout including rows and columns that together define a plurality of regularly sized and shaped grid cells; automatically and programmatically arranging those items marked for inclusion in the electronic menu in the grid cells of the grid-based layout in a manner that minimizes the number of unused grid cells; storing, to a file on the non-transitory computer readable storage medium, a tag-based representation of the layout, following said arranging, the tag-based representation of the layout corresponding to the formatted electronic menu; and making the file available to electronic devices in order to in turn enable the electronic devices to display and enable user interaction with the formatted electronic menu.

Similarly, in certain example embodiments, there is provided a program and/or a non-transitory computer readable storage medium tangibly storing instructions that, when executed, perform the above-described and/or other methods.

Similarly, in certain example embodiments, there is provided a system for use at a venue, with the system comprising a plurality of electronic devices distributed to patrons on behalf of the venue, and with each said electronic device being configured to display an electronic menu formatted in accordance with the method of claim 1.

According to certain example embodiments, the arranging comprises: adding to a source set a representation of each of the items identified by the received input; defining a state object having a predetermined number of rows and a number of columns equal to the number of columns in the grid-based layout that together define a plurality of state object cells, the state object cells having the same size and shape as the grid cells; (a) determining how many state object cells are unused in the first row of the state object; (b) removing elements from the source set and adding the removed elements to an insertion set while the total width of the elements added to the insertion set, as measured in cells, is less than the number of unused cells in the first row of the state object; (c) attempting to reorder the elements in the insertion set to fill the unused cells in the first row of the state object; (d) in response to a valid order being determined in (c), placing the reordered elements in the state object in this reordered order until all unused cells are filled and returning to the source set in their initial order any unused elements remaining in the insertion set; (e) in response to no valid order being determined in (c), searching for an appropriately-sized element from among the first predetermined number of elements in the source set; (f) in response to an appropriately-sized element being found in (e), removing the appropriately-sized element from the source set and adding it to the insertion set, reordering the elements in the insertion set to fill the unused cells in the first row of the state object, and placing the reordered elements in the state object in this reordered order until all unused cells are filled and returning to the source set in their initial order any unused elements remaining in the insertion set; and (g) if the source set is not empty, designating the row following the first row of the state object as the new first row of the state object and repeating (a)-(f), but otherwise defining the grid-based layout in accordance with the state object.

According to certain example embodiments, the arranging comprises: adding to a source set a representation of each of the items identified by the received input, the elements in the source set being ordered in accordance with a desired display order for the corresponding items; dividing the grid-based layout into a plurality of segments, each said segment including at least two rows and all columns in these rows that together define segment cells; (a) starting with the first segment, and starting at the beginning of the source set, identifying elements in the source set whose total cell space is less than or equal to the number of cells in the segment, and removing those identified elements from the source set; (b) selecting a segment layout from a pre-generated set of possible segment layouts for the identified elements, based on the combination of dimensions of the items associated with identified elements, as represented in cells; (c) laying out the items in the first segment in accordance with the selected segment layout; and (d) if the source set is not empty, designating the segment following the first segment as the new first segment and repeating (a)-(c), but otherwise defining the grid-based layout in accordance with the laid-out segments.

According to certain example embodiments, the arranging comprises: adding to a source set a representation of each of the items identified by the received input, the elements in the source set being ordered in accordance with a desired display order for the corresponding items; dividing the grid-based layout into a plurality of segments, each said segment including a number of rows that is at least one row greater than a maximum size of the elements, as expressed in cells, and all columns in these rows, so that the segment rows and segment columns collectively define segment cells; (a) starting with a first segment, determining how many segment cells are unused in its last row and, in response to a determination that there are no unused segment cells in its last row, adding the first segment to the grid-based layout and making the next segment the first segment; (b) starting with the first segment, and starting at the beginning of the source set, identifying elements in the source set whose total cell space is less than or equal to the number of unused cells in the first row of the first segment, and removing those identified elements from the source set; (c) attempting to first reorder and if necessary then rotate at least some of the identified elements to fill the unused cells in the first row of the first segment; (d) in response to a successful attempt in (c), placing the reordered and/or rotated elements in the first segment in this reordered and/or rotated order and returning to the source set in their initial order any unplaced identified elements; (e) in response to an unsuccessful attempt in (c), searching the source set for an element from among the first predetermined number of elements in the source set that is appropriately-sized and/or re-orientatable to be appropriately-sized to fill unused cells in the first row of the first segment; (f) in response to an appropriately-sized and/or re-orientatable element being found in (e), removing the appropriately-sized element from the source set and considering it one of the identified elements, attempting to first reorder and if necessary then rotate at least some of the identified elements to fill the unused cells in the first row of the first segment, placing the reordered and/or rotated elements in the first segment in this reordered and/or rotated order and returning to the source set in their initial order any unplaced identified elements; and (g) if the source set is not empty, designating the row following the first row of the first segment as the new first row of the first segment and repeating (a)-(f), but otherwise defining the grid-based layout in accordance with the first segment.

The exemplary embodiments, aspects, and advantages disclosed herein may be provided in any suitable combination or sub-combination to achieve yet further exemplary embodiments.

BRIEF DESCRIPTION OF THE DRAWINGS

These and other features, aspects, and advantages of the instant invention will be further understood by review of the following detailed description of the exemplary embodiments when read in conjunction with the appended drawings, in which:

FIG. 1 is a block diagram showing elements that may exist in a restaurant in which an eMenu made in accordance with certain exemplary embodiments may be used;

FIG. 6 is an example category table that may be used in certain exemplary embodiments;

FIG. 7 is an example products table that may be used in certain exemplary embodiments;

DETAILED DESCRIPTION

Figure 2A:
FIGS. 2a-2i help demonstrate an example technique for creating an eMenu in accordance with certain exemplary embodiments.

Certain exemplary embodiments relate to techniques for generating electronic menu (eMenu) graphical user interface (GUI) layouts for use in connection with electronic devices such as, for example, tablets, phablets, smart phones, and/or other electronic devices.

Referring now more particularly to the drawings, FIG. 1 is a block diagram showing elements that may exist in a restaurant in which an eMenu made in accordance with certain exemplary embodiments may be used. Many patron-operable devices 102a-102j are shown in FIG. 1. In the FIG. 1 example, the patron-operable devices 102a-102j are grouped such that each member in a party has his or her own patron-operable device 102. As indicated above, the individual devices may be tablets, phablets, smart phones, and/or other electronic devices.

The devices may be the same or different device types in different implementations, and they may be the patrons' own devices (e.g., onto which a suitable eMenu application has been downloaded and installed), devices provided by the restaurant and loaned to the patrons (e.g., onto which the same or similar suitable eMenu application has been downloaded and installed), or a mixture of the two. The patrons may use the patron-operable devices 102a-102j to browse an eMenu made in accordance with certain exemplary embodiments, place orders, call a staff member (e.g., with a predefined message such as, fore example, "ready to order," "please bring refills," "napkins needed", "check please", etc.; a custom message; and/or as a general matter without a specific message), play single or multi-player games (e.g., table-wide, restaurant-wide, and/or broader-scale games such as trivia), control a television or other display provided at table or elsewhere, interact with a jukebox, and/or interact with other entertainment offerings. Patron-operable devices may be distributed to patrons prior to their being seated for use in the location, e.g., for ordering drinks from a bar, playing games, receiving notifications when a table is ready, checking on estimated wait times and/or location in a queue, etc.

Wait staff who serve the patrons may have their own wait staff devices 104a-104c. Wait staff operable devices 104a-104c may be used to place orders on behalf of patrons, confirm patrons' orders, etc. A host-operable device 106, which may run the same or similar application as the wait staff operable devices 104a-104c, also may be provided. These devices may also provide waitlist information, generate estimated wait times, etc.

In certain exemplary embodiments, the wait staff operable devices 104a-104c and/or the host-operable device 106 may be phablets or smaller tablets, e.g., to facilitate mobility, whereas the patron-operable devices 102a-102j may be larger tablets or the like.

A local server 108 is provided in the location, e.g., to provide content caching (e.g., useful in the administration of local games such as trivia), coordination of media output to the displays 110a-110c, distribution of newly downloaded music to the jukebox 112, generate backups of orders and/or other onsite information, etc. The local server 108 thus may have a connection to the Internet and/or another outside network.

In addition to or in place of the local server 108, certain exemplary embodiments may incorporate a management computer 114. The management computer 114 and/or the local server 108 may receive orders from the wait staff operable devices 104a-104c and/or the patron-operable devices 102a-102j (e.g., depending on the implementation in terms of who is allowed to place orders). It also may relay orders to kitchen staff, manage notifications to wait staff when orders are ready, generate bills, etc. The management computer 114 may also administer the waitlist, potentially keeping track of when parties are seated, how long parties remain seated on average and/or in accordance with a general rule defined by the location and/or an outside party, etc. The host-operable device 106, the wait staff operable devices 104a-104c, and/or the patron-operable devices 102a-102j may be able to access this waitlist information, e.g., as indicated above. The local server 108 may backup this and/or other related information in certain exemplary embodiments.

The displays 110a-110c may be televisions or other professional displays and, as such, may receive video feeds from cable boxes, satellite receivers, streaming network sources over IP, and/or the like. As alluded to above, the displays 110a-110c may be managed by the local server 108 and/or the management computer 114.

The jukebox 112 may be a digital downloading jukebox or the like. See, for example, U.S. Publication No. 2013/0070093, the entire contents of which are hereby incorporated herein by reference. As alluded to above, the jukebox 112 may be interacted with and/or at least partially controlled by host-operable device 106, the wait staff operable devices 104a-104c, and/or the patron-operable devices 102a-102j.

In terms of generating an eMenu, the inventors of the instant application have realized that a grid-based approach to locating items can be beneficial when it comes to laying out items in a cohesive and visually interesting manner. The grid-based approach also advantageously facilitates automation when it comes to eMenu generation, thereby reducing the need for custom programming and enabling more dynamic menu generation that, in turn, can be helpful when a restaurant wishes to change which items are featured, add items to and/or remove items from a menu, etc. In the examples that follow, the display on each tablet is divided into a grid with four columns and three rows when horizontally oriented. This provides 12 cells total, and menu items may take up one or more cells, depending on a variety of factors. For instance, a menu item that includes text and an image may be a 2×1 or 1×2 entry on the eMenu. A highlighted or otherwise featured menu item may be a 2×2 entry on the eMenu. Other items (e.g., basic graphics and/or items with text but lacking images) may be 1×1 entries on the eMenu. Navigational components also may be provided, e.g., to browse between breakfast, dinner, lunch, and/or other "sub-menus", to move between the eMenu itself and other entertainment-related and/or other features provided on the device (such as, for example, jukebox control, game play, etc.).

Several specific approaches for automatically generating eMenus are set forth below. In general, these approaches receive input that includes structural information about the main sections of a menu and, optionally, one or more hierarchically arranged sub-sections, of that menu. In addition to this structural information, content information is provided. The content information may include, for example, an identifier of the items (e.g., an appetizer's name), whether there is an associated image (and if so, a filename and/or pathname indicating where the image is located), a flag for whether the item is featured (optionally with information concerning how long it is to be featured), pricing information, etc. These pieces are fit together in the grid to, among other things, main structural information and reduce the "lost space" in the menu. Certain exemplary embodiments may attempt to follow the order of the layout as closely as possible, e.g., to preserve the layout of the prior menu. However, adjustments may be made to reduce wasted space, etc., in certain exemplary embodiments, and this may adjust the ordering of certain elements. It also is noted that items may be shuffled, potentially at random, e.g., to expose users to different items.

Once the layout is determined, it may be stored to a file in a format readable by applications running on the patron-operable devices, e.g., so that they can display the eMenu. In certain exemplary embodiments, a tag-based and/or other format may be used. For instance, an XML file, JSON file, and/or the like, that conforms to a predefined schema may be read by applications running on the patron-operable devices and used to generate the displays accordingly. The devices may store the layout file locally or retrieve it from a network location (e.g., from a local server, management computer, and/or other location). Central storage and/or distribution may help promote changeability over time. The devices similarly may access the content referenced in the layout file from a local or more centralized location (e.g., from a local server, management computer, and/or other location). It is noted that layout files may be generated for different orientations (horizontal vs. vertical), different device types (e.g., such that more cells are provided for devices with larger displays as compared to devices with smaller displays, etc.). The application running on the devices may determine orientation (e.g., using accelerometers, gyroscopes, and/or the like), device type and/or hardware components, etc., and access the appropriate layout file(s).

A more detailed description of three example approaches for laying out menu items will now be provided. It will, of course, be appreciated that these and/or other approaches may be used in connection with different exemplary embodiments. It is noted that the approaches may be implemented as instructions stored on a non-transitory computer readable storage medium. Such instructions may read a source menu file and produce an output file in a specified format, e.g., after the instructions have been performed by at least one processor of a suitably configured computer system.

First Example Layout Approach

The first example layout approach assumes that items are to be placed on a device's display, with as little empty space as reasonably possible while still maintaining the general order of the menu items. More particularly, assumptions are made that menu items are organized in categories and sub-categories, and that menu items within sub-categories should be displayed in the order that is provided. This also approach assumes a four column layout, implying that each row on a display contains four cells. As indicated above, elements can be 1×1 (e.g., for items without pictures and/or for items that are only pictures), 1×2 and 2×1 elements (e.g., for items with pictures, respectively organized side-by-side and stacked vertically), and 2×2 items (e.g., for items associated with a promotion, that are featured, etc.).

The approach also maintains a state object, which describes the current state of the layout. The state object in this example contains information about which cells are available in the "first row."

The first example layout approach is iterative. For each iteration, the approach:

Obtains information about available cells from state object, including determining how many cells are available in the "first row."

Adds to a set elements from a source menu item list while the total width of the elements added is less than the number of available cells.

Attempts to reorder the elements in the set to fill available (or "empty") cells. If such an order exists, the elements are placed into the layout using this order. All unused items in the set are returned to the beginning of the source list according to their initial order.

Searches for an appropriately-sized element with the first predetermined number of elements (e.g., the first 3, 5, or other number of elements) in the source list, if such an order was not found to exist in the prior point. If such an element exists, it is added to the set and an order for the new set is selected. The elements are placed into the layout using this order. All unused items in the set are returned to the beginning of the source list according to their initial order.

If there are no suitable elements, an empty space is left. Filler material (e.g., a stock image, background, and/or the like) optionally may be inserted into the area.

Figure 2B:
Figure 2C:
Figure 2D:
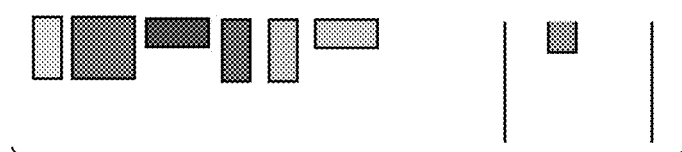
Figure 2E:
Figure 2F:
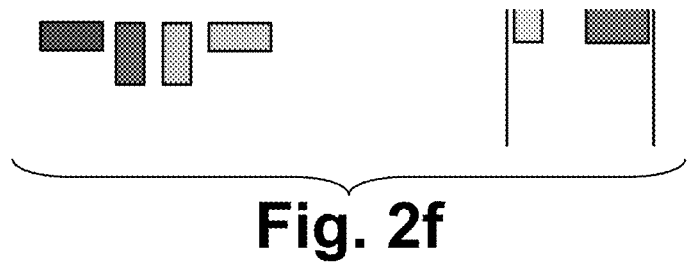
Figure 2G:
Figure 2H:
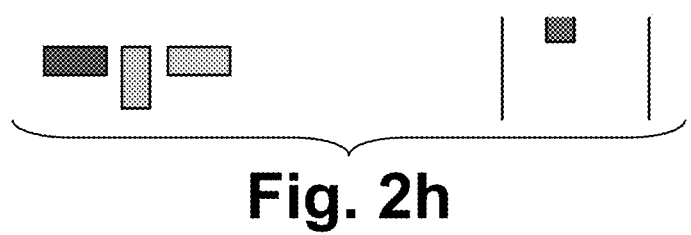
Figure 2I:
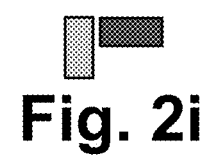
Figure 3:
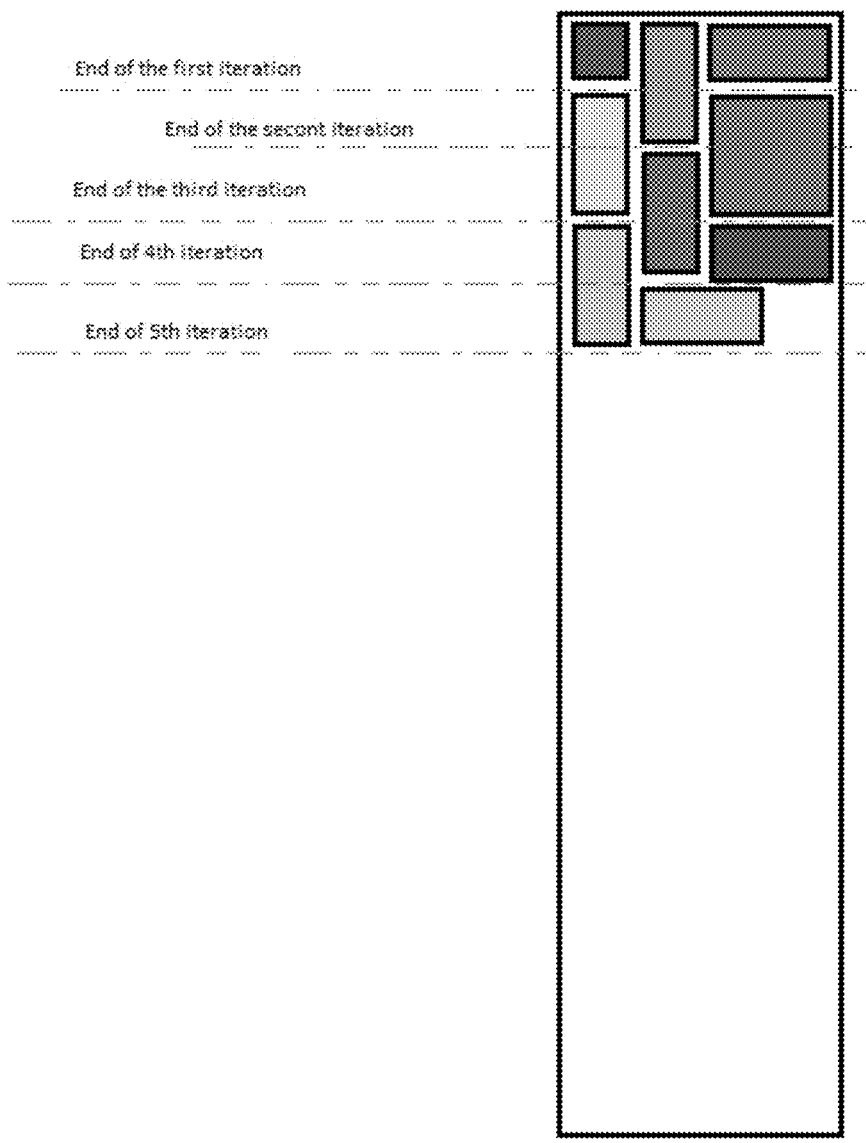
FIG. 3 is an illustrative timeline that helps demonstrate the example approach shown in and described in connection with FIGS. 2a-2i.

FIGS. 2a-2i help demonstrate an example technique for creating an eMenu in accordance with certain exemplary embodiments, and FIG. 3 is an illustrative timeline that helps demonstrate the example approach shown in and described in connection with FIGS. 2a-2i. FIG. 2a shows nine elements to be included in an eMenu. Moving from left to right, FIG. 2a shows 1×1, 2×1, 2×1, 1×2, 2×2, 1×2, 2×1, 2×1, and 1×2 items. Initially, four cells in the first row are available (the state object is completely empty), so the first elements are taken from the source list while the total width is less than four. Because of the way the loop is structured, the first four elements are taken, as shown in FIG. 2b. Because the total width is more than the number of available cells (e.g., 5>4), an attempt is made to reorder the elements to fill the row. The set shown in FIG. 2c (including elements 1, 2, and 4) thus is taken. The unused element (element 3) is returned to the beginning of the source list. The reordered elements are added to the layout.

At this point, the first row is filled and therefore is no longer needs to be considered. The second row in the eMenu thus is treated as the first row, and the end of the first iteration is reached. See FIG. 2 for the eMenu layout at the end of the first iteration.

At the beginning of the second iteration, the six elements shown at the left of FIG. 2d remain and the state object shown at the right of FIG. 2d indicates that the second cell in the first row is filled. Thus, there are three empty cells in the first row and, as shown in FIG. 2e, the first two elements from the source list are taken. The total width is equal to the amount of empty cells. Furthermore, there is no need to reorder the elements, as the 2×1 entry will fit in the leftmost empty cell, and the 2×2 entry will fit in the two farthest right empty cells. The second iteration thus is ended. See FIG. 3 for the eMenu layout at the end of the second iteration.

At the beginning of the third iteration, the four elements shown at the left of FIG. 2f remain and the state object shown at the right of FIG. 2f indicates that the first, third, and fourth cells in the first row are filled. One cell needs to be filled. At this point, the element shown in FIG. 2g is taken. This set (with one 1×2 element) cannot be reordered in a manner to make it fit in the empty cell. Thus, a search is performed within a predetermined number of elements (e.g., 3) in the source list. The second element in the source list is determined to be suitable, and it then is used to fill the empty cell. The element that cannot be used is placed at the beginning of the source list. The end of the third iteration is reached. See FIG. 2 for the eMenu layout at the end of the third iteration.

At the beginning of the fourth iteration, the four elements shown at the left of FIG. 2h remain and the state object shown at the right of FIG. 2h indicates that only the second cell is filled. Thus, the first, third, and fourth cells in the first row are empty and can be filled. The first two elements from the list are taken and reordered in the manner shown in FIG. 2i. These elements are then added to the eMenu. The end of the fourth iteration is reached. See FIG. 2 for the eMenu layout at the end of the fourth iteration.

Only one element remains at this time, and it is inserted into the eMenu in the left-most empty spaces. The end of the fifth iteration is reached. See FIG. 3 for the eMenu layout at the end of the fifth iteration.

It will be appreciated from FIG. 3 that there are no empty spaces, aside from the very last cell in the bottommost and rightmost corner.

In certain exemplary embodiments, checks may be performed to make sure that difficult to place items are not shifted more than a threshold number of times. Doing so could result in the specific menu item being forced into a location far outside of its expected and/or most "natural" location. Some inefficiency in spacing thus may be tolerated.

Second Example Layout Approach

A similar set of assumptions as those discussed above in connection with the first example layout approach applies here, as well. However, in certain exemplary embodiments, an additional assumption may be made concerning two-cell items. More particularly, in certain exemplary embodiments, an assumption may be made that if an item has a picture, it can be displayed either as a 1×2 or a 2×1 element. Thus, in this example approach, the number of cells occupied is deemed more important than the orientation (e.g., unless a preferred or required orientation is specified).

The second example layout approach involves a segment-based approach. In the segment based approach:

The display area for laying out the menu items is divided into segments. For this example, each segment is a 2×4 (2 row by 4 column) segment. It is noted, however, that differently-sized segments may be used in different exemplary embodiments.

A layout is generated for each segment, one at a time, starting from the top of each sub-category. As implied above, each menu item will take up either one, two (horizontally or vertically oriented), or four (2×2) cells.

In the segment layout approach:

All possible ways for laying out any combination of menu items are pre-generated. For example, for the 2×4 segment example contemplated herein, There is only one possible layout for eight single-cell items;

There are four possible layouts for four two-cell items; and

There are two possible layouts for two four-cell items.

It is, however, noted that other use cases are contemplated herein (e.g., for a scenario where there is one four-cell item, one two-cell item, two one-cell items; etc.).

The menu items are sorted by their desired display order.

Starting from the top of sorted menu item list, a search is performed to find the first few items whose total cell space adds up to a number less than or equal to eight (e.g., such that if the number of less than 8, it is the closest it can be without going over and/or optionally while retaining the desired order).

The pre-generated layouts for this combination of menu items are recalled.

Of the recalled pre-generated layout(s), one is selected (e.g., at random, in a predetermined order, by a user, and/or in some other manner).

The items are laid out in accordance with the selected recalled pre-generated layout.

This process is repeated, moving down the list, until all menu items are placed.

If there is an empty space in a segment, a filler image and/or the like may be used. It is noted that this may be performed in line and/or at the end of the process.

This approach advantageously is very extensible. It is noted, for example, that the segment size can be changed. In certain exemplary embodiments, different segment sizes can be used simultaneously for displaying one menu. In a similar vein, the menu item sizes can vary.

Certain exemplary embodiments may incorporate further enhancements. For example, at the end of a menu item list, if the total space of the items left is less than or equal to four, remaining elements may be placed in a single row. As another example, different weights can be given to different layouts for one combination of menu items, e.g., so that one or more of them are preferred over others.

Third Example Layout Approach

The third example layout approach in essence combines aspects of the two previously discussed approaches. That is, it fills a container segment-by-segment, like the second approach discussed above, and each segment is filled row-by-row and left-to-right like the first approach. For this example, the initial segment size is three rows by four columns.

Furthermore, this approach attempts to rotate elements, e.g., in order to try to fill each row as fully as possible. The iterative approach in this example is similar to the iterations performed in the first example approach discussed in detail above. For each iteration in this approach:

If the previous "last row" was filled completely, it is considered that a new empty segment and a new "first row" should be filled.

Information about the number of available cells in the first row is obtained from the state object.

Several elements are taken from the source menu items list while the total width of these elements is less than the number of available cells.

If the set of taken elements cannot be inserted into the first row, an attempt is made to rotate some of the elements to arrive at a suitable combination. If such a combination exists, the elements that fit are placed into the layout. All unused items are returned to the beginning of the source list according to their initial order.

If there is no suitable combination, an attempt is made to reorder and rotate any of the elements to fill the empty cells. If such a combination exists, the elements that fit are placed into the element. All unused items are returned to the beginning of the source list according to their initial order.

If no elements were inserted, a search is made for an appropriately-sized element with the first predetermined number of elements (e.g., the first 3, 5, or other number of elements) in the source list. Attempts to rotate and/or reorder elements in the new set of menu items are made so that a fit is found. If there is a combination that fits, the items are placed in the layout. All unused items in the set are returned to the beginning of the source list according to their initial order.

If there are no suitable combinations, an empty space is left. Filler material (e.g., a stock image, background, and/or the like) optionally may be inserted into the area.

Figure 4A:
FIGS. 4a-4g help demonstrate another example technique for creating an eMenu in accordance with certain exemplary embodiments.
Figure 4B:
Figure 4C:
Figure 4D:
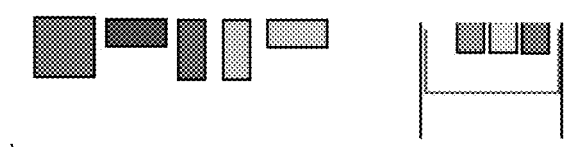
Figure 4E:
Figure 4F:
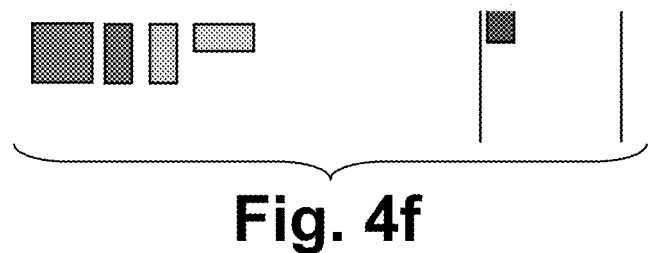
Figure 4G:
Figure 5:
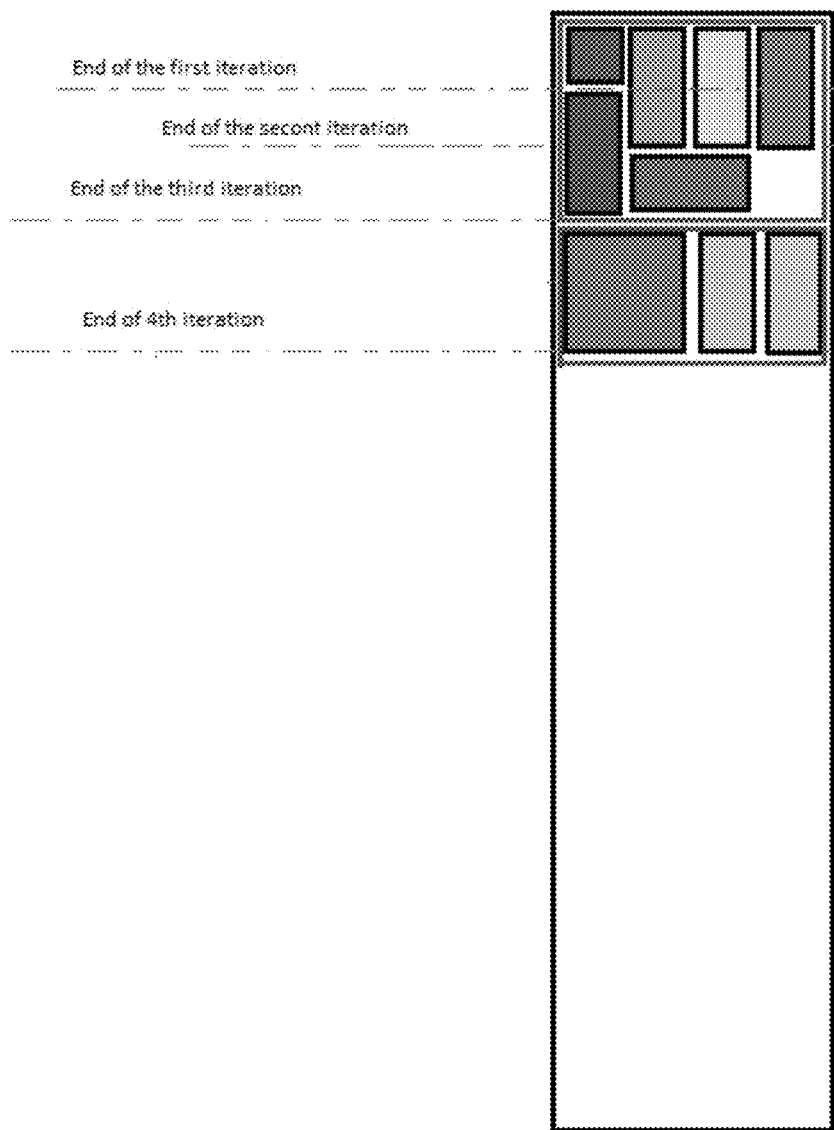
FIG. 5 is another illustrative timeline that helps demonstrate the example approach shown in and described in connection with FIGS. 4a-4g.

FIGS. 4a-4g help demonstrate another example technique for creating an eMenu in accordance with certain exemplary embodiments, and FIG. 5 is another illustrative timeline that helps demonstrate the example approach shown in and described in connection with FIGS. 2a-2i. FIG. 4a shows nine elements to be included in an eMenu. Moving from left to right, FIG. 4a shows 1×1, 2×1, 2×1, 1×2, 2×2, 1×2, 2×1, 2×1, and 1×2 items. The red boxes shown in FIG. 5 and in the state object representations represent segment frames. Initially, four cells in the first row are available (the state object is completely empty), so the first elements are taken from the source list while the total width is less than four. Because of the way the loop is structured, the first four elements are taken, as shown in FIG. 4b. The combination shown in FIG. 4b cannot be inserted into the first row, an attempt is made to rotate the elements in order to find a combination that fits, which results in the layout shown in FIG. 4c. This is the end of the first iteration.

At the start of the second iteration, the menu items shown at the left of FIG. 4d remain and the state object is shown at the right of FIG. 4d. Only one cell needs to be filled, so only the item shown in FIG. 4e is retrieved. This element cannot fill one cell, even if rotated.

Thus, a search is made to locate suitable elements in the remainder of the list. The second item in the FIG. 4d list can be rotated to fit, so it is placed in the layout. The element shown in FIG. 4e is unused, so it is returned to the beginning of the source list. This is the end of the second iteration.

At the start of the third iteration, the menu items shown at the left of FIG. 4f remain and the state object is shown at the right of FIG. 4f. At this point, three cells in the last row need to be filled. However, the end of the segment frame is about to be reached. Thus, it only is possible to fill the space with a 1×2 item (possibly with a 1×1 items), or with one or more 1×1 items. The second element shown in FIG. 4f is selected, rotated, and inserted. Because there is no possible way to fill in the last cell using the elements remaining, that segment is considered filled. This is the end of the third iteration and the completion of the first segment frame.

In the fourth iteration, a new segment frame is started, and there is a need to fill in its first row. This can be done using the three remaining items, e.g., if they are arranged as shown in FIG. 4g. These elements are added to the layout, and all items have been placed.

Example Input File Format

Structured information regarding the eMenu to be generated may be provided in any suitable form. In certain example embodiments, four tables may be provided, e.g., for identifying categories of products, products, drinks, and filler materials. Such tables may, for instance, be provided in separate flat text files, as multiple worksheets in an Excel Workbook, as multiple tables in an Access or other database, etc.

An example categories table may include a column for the names of the categories. To help maintain some hierarchical information, an optional "parent category" column may be provided. For instance, "wine list," "house," "white," and "red," may be category names. The "wine list" category optionally may be provided as the parent category for each of "house," "white," and "red." Descriptions may be provided for some or all categories. Categories may have images associated with them, and they may be published to an eMenu and/or orderable from an eMenu at certain predefined times. Table 1 below includes entries for an example categories table:

TABLE 1

| Parent Category | Name | Description | Full Image URL | Publish | Order | Start time | End time |
| --- | --- | --- | --- | --- | --- | --- | --- |
| | Appetizers | | | | | | |
| | Wings | | | | | | |
| | Entrees | | | | | | |
| | Sandwiches | | | | | | |
| | Salads | | | | | | |
| | Classic Burgers | | | | | | |

TABLE 1-continued

| Parent Category | Name | Description | Full Image URL | Publish | Order | Start time | End time |
|---|---|---|---|---|---|---|---|
| | Specialty Burgers | | | | | | |
| | Sides | | | | | | |
| | Sidelines | Substitute one of these items for a small upcharge | | | | | |
| | Soups & Chili | | | | | | |
| | Desserts | | | | | | |
| | Seasonal Menu | | | | | | |
| | Gluten Free | | | | | | |
| | Kids | | | | | | |
| | Signature Cocktails | | | | | | |
| | Classic Cocktails | | | | | | |
| | Beer Cocktails | | | | | | |
| | Bottled Beer | | | | | | |
| | Draft Beer | | | | | | |
| | Wine List | | | | | | |
| Wine List | House | | | | | | |
| Wine List | White | | | | | | |
| Wine List | Red | | | | | | |
| | Sangrias | | | | | | |
| | Margaritas & Frozen Drinks | | | | | | |
| | Non-Alcoholic | | | | | | |

An example products table may include information identifying the name of the product and the category to which the product belongs. An optional description and/or image may be identified, as well. A flag indicating whether the product should be published to the eMenu also may be set. Optionally, inventory or stock may be maintained. This may, for example, help indicate when items should not be published and/or listed as available. An indication whether the product is "on special" or to be featured may also be provided.

Optionally, time periods defining specials may be included as well (e.g., designating lunch specials as times during any given day, themed specials as belonging to a season such as the winter holidays or one or more months for March Madness or the like, etc.). Pricing information may also be provided. This may take the form of a main price, and optional pricing schemes (e.g., for full versus half orders, different numbers of items such as wings or the like, etc.). FIG. 6 includes entries for an example products table. The same information may be provided for an example drinks table, e.g., as shown in FIG. 7. In certain exemplary embodiments, the products and drinks tables may be combined.

For filler information, images from a filler table may be used. The filler table may specify the height (in table cells, pixels, or other measure), and identify an image. An example filler table is provided below in Table 2:

TABLE 2

| Width | Height | Image URL |
|---|---|---|
| 1 | 3 | /fillers/2min_gameclock_bw.png |
| 2 | 3 | /fillers/4thQuarter_bw.png |
| 2 | 3 | /fillers/Bottom9th_bw.png |
| 2 | 3 | /fillers/hockey_darkblue_bw.png |

Example Output File Format

Once the placement approach has determined the proper coordinates in the table for each menu item, an output file may be generated. As indicated above, the output file may be based on an underlying schema and may be formatted as an XML document, JSON file, and/or the like. The schema may specify fields for different item types. For instance, for menu items, a size attribute may be defined. Acceptable values may be 1, 2, or 4 (e.g., corresponding to the number of cells occupied by the item). As another example, coordinates may be defined, e.g., identifying the cell in the table, pixel location, or other position, where the top left corner of the element is to be placed, etc. An example JSON file is set forth in the attached Code Appendix.

Figure 8A:
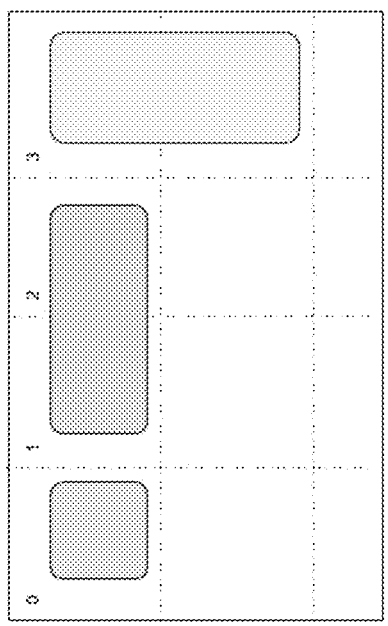
FIGS. 8a-8b schematically show how a schema file may be used to organize elements in accordance with certain exemplary embodiments.
Figure 8B:
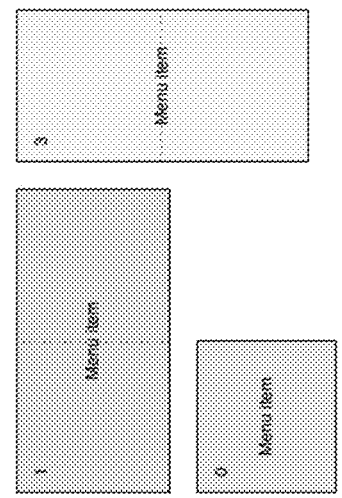

The file may be accessed locally and/or from a network location via an application running on the patron-operated device. For instance, the application may include code for retrieving and parsing the file, and entering the data in a locally stored database, e.g., for possible subsequent local-based reproduction. The database may be read when the eMenu is opened, with the application retrieving information from the database and displaying the eMenu on the patron-operated device. FIGS. 8a-8b schematically show how a schema file may be used to organize elements in accordance with certain exemplary embodiments. More particularly, a schema file may direct the menu items to be displayed in the grid, e.g., as shown in the FIG. 8a example, or the FIG. 8b example, based on retrieved information linking the item numbers to specific coordinates, cells, or the like.

Figure 9:
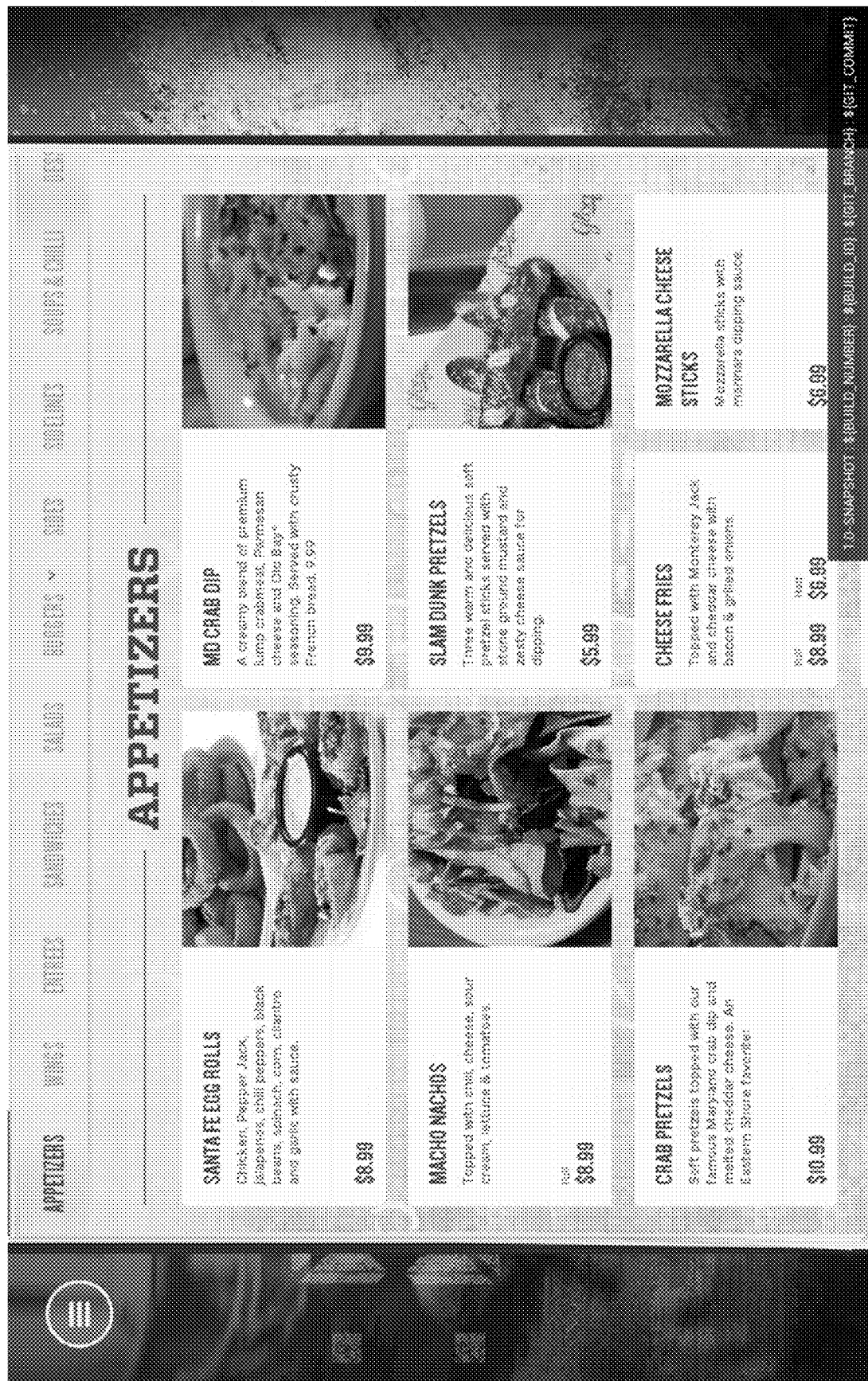
FIG. 9 is an example eMenu made in accordance with certain exemplary embodiments.

FIG. 9 is an example eMenu made in accordance with certain exemplary embodiments. As can be seen from FIG. 9, categories of items are provided as discrete and selectable elements in a horizontal line at the top of the example display. The appetizers menu is selected, and the appetizers category title is shown in large type in the center of the screen.

Menu items derived from the products table associated with the appetizers category are displayed in the table-based approach below the appetizers category title. The entry names are shown, together with their descriptions and prices. In the case of the cheese fries appetizer, two pricing models are provided—one for a full order with a first price, and another for a half order with a second price. As can be seen, there are three rows and four columns. The entries in the first two rows are 2×2 entries, with each including a text and an image. There is one 1×2 entry and two 1×1 entries in the last row.

The menu icon in the upper left corner may be used to enable patrons to access other content provided through the device such as, for example, the entertainment offerings noted above.

A user may select an item (e.g., through a touch interface provided by the device), confirm that it should purchased, and add it to an order. In certain example embodiments, coordination may be provided between the users at a given table and/or in a given party. For instance, because each person may be provided with his or her own device, all orders may be added to a single order and synchronized so that the order is placed at once. Similarly, updates may be pushed to a table at a time, e.g., once the order has been entered, prepared, delivered, when the check is ready, etc.

In certain exemplary embodiments, payment may be processed using the techniques set forth in U.S. Application Ser. No. 61/875,195, filed on Sep. 9, 2013, the entire contents of which are hereby incorporated by reference herein.

It will be appreciated that although certain exemplary embodiments involve a row-by-row top-to-bottom approach, the same or similar techniques may be used on a row-by-row bottom-up basis, in a column-by-column left-to-right or right-to-left approach, etc.

Similarly, although certain exemplary embodiments involve a left-to-right approach, right-to-left, top-to-bottom, bottom-to-top, and/or the like may be used in different exemplary embodiments.

It is noted that the example algorithms discussed herein are sufficiently generic to accommodate different numbers of columns in a grid, different numbers of cells used by menu items, and/or the like.

In view of the foregoing, it will be appreciated that certain exemplary embodiments provide automated eMenu GUI layout generation. The techniques of certain exemplary embodiments can accommodate dynamic patterns instead of simple repetitions, thereby created interesting visual aesthetic effects suitable for use with an electronic device such as a tablet or the like. The techniques of certain exemplary embodiments additionally or alternatively may provide for a coherent flow and organization of items instead of a more random placement. Thus, certain exemplary embodiments are able to maintain a desired menu item display order with an acceptable amount of deviation in an easy to implement, fast running, flexible and extensible approach.

While the preferred aspects of the invention have been illustrated and described herein, it will be apparent to one of ordinary skill in the art that various changes and/or modifications can be made. Thus, the specific description herein is meant to be exemplary only and is not intended to limit the invention beyond the terms of appended claims.

CODE APPENDIX

```
"products": [
    {
        "productName": "first item",
        ...
        "size": {
            "width": 2,
            "height": 1
        },
        "coord": 1,
        ...
    },
    {
        "productName": "Second item",
        ...
        "size" : {
            "width": 1,
            "height": 1
        },
        "coord": 0,
        ...
    },
    {
        "productName": "Third item",
        ...
        "size" : {
            "width": 1,
            "height": 2
        },
        "coord": 3,
        ...
    }
]
{"categories": [
    {
        "name": "name 566517979",
        "description": "description 566517979",
        "publish": true,
        "id": "98f01ef0-893c-4797-9242-63f1c2d73878"
    },
    {
        "name": "name 840366165",
        "description": "description 840366165",
```

-continued

CODE APPENDIX

```
        "publish": true,
        "id": "a2db3f82-f7af-4258-9405-108da9e77651",
        "parentCategory": {
            "id": "98f01ef0-893c-4797-9242-63f1c2d73878"
        }
    },
    {
        "name": "name 1761570653",
        "description": "description 1761570653",
        "publish": true,
        "id": "7887308f-7b7c-4690-88af-b1d021b1e39f"
    },
    {
        "name": "name 360165935",
        "description": "description 360165935",
        "publish": true,
        "id": "82cec2ad-700c-4dd8-8f94-12797463700a",
        "parentCategory": {
            "id": "7887308f-7b7c-4690-88af-b1d021b1e39f"
        }
    },
    {
        "name": "name 1126268359",
        "description": "description 1126268359",
        "publish": true,
        "id": "da103920-edbb-4fbc-bcec-9f6086278284"
    },
    {
        "name": "name 1514852105",
        "description": "description 1514852105",
        "publish": true,
        "id": "41703a9c-e203-45ab-8635-7ec230336890"
    },
    {
        "name": "name 379580735",
        "description": "description 379580735",
        "publish": true,
        "id": "4f27921f-6c21-4a4f-8892-8dbadd7de804",
        "parentCategory": {
            "id": "41703a9c-e203-45ab-8635-7ec230336890"
        }
    },
    {
        "name": "name 760843928",
        "description": "description 760843928",
        "publish": true,
        "id": "32dc54f0-6b1b-44b1-99e1-a822b5d99c97"
    },
    {
        "name": "name 1699865658",
        "description": "description 1699865658",
        "publish": true,
        "id": "bb0070d4-3cc5-41a2-9b8c-a53b5a4fa901"
    },
    {
        "name": "name 1263978666",
        "description": "description 1263978666",
        "publish": true,
        "id": "fb677dd6-7dc0-486e-aed1-53945795e627",
        "parentCategory": {
            "id": "bb0070d4-3cc5-41a2-9b8c-a53b5a4fa901"
        }
    },
    {
        "name": "name 1894606224",
        "description": "description 1894606224",
        "publish": true,
        "id": "f61eab3d-4704-4de5-960f-6cc9df074743"
    },
    {
        "name": "name 1706277825",
        "description": "description 1706277825",
        "publish": true,
        "id": "a9ee4bc1-e5fb-49e7-986b-fa617e3f1269",
        "parentCategory": {
            "id": "f61eab3d-4704-4de5-960f-6cc9df074743"
        }
    },
```

CODE APPENDIX

```
        },
        {
                "name": "name 477238314",
                "description": "description 477238314",
                "publish": true,
                "id": "1ca6be78-e300-4d19-9ae4-00f91C187165"
        },
        {
                "name": "name 1063832317",
                "description": "description 1063832317",
                "publish": true,
                "id": "04d7e93b-db26-404c-bd00-368b00af806e",
                "parentCategory": {
                        "id": "1ca6be78-e300-4d19-9ae4-00f91C187165"
                }
        },
        {
                "name": "name 2045799559",
                "description": "description 2045799559",
                "publish": true,
                "id": "e738d931-c98e-428c-8275-dbe331471f24"
        },
        {
                "name": "name 1429461556",
                "description": "description 1429461556",
                "publish": true,
                "id": "00fb2781-2ba0-4598-9d90-f7a4d985978e"
        },
        {
                "name": "name 329466642",
                "description": "description 329466642",
                "publish": true,
                "id": "50111793-d9fb-4fcc-8beb-2f5cf30baa56",
                "parentCategory": {
                        "id": "00fb2781-2ba0-4598-9d90-f7a4d985978e"
                }
        }
], "products": [
        {
                "name": "name 249988132",
                "publish": false,
                "special": true,
                "id": "20d79564-b07f-459e-b1de-9f5767292601",
                "category": {
                        "id": "98f01ef0-893c-4797-9242-63f1c2d73878"
                }
        },
        {
                "name": "name 1212192095",
                "publish": false,
                "special": false,
                "id": "ba7757cc-bc5c-4291-8242-c47e06ca1716",
                "category": {
                        "id": "a2db3f82-f7af-4258-9405-108da9e77651"
                }
        },
        {
                "name": "name 428371761",
                "publish": false,
                "special": false,
                "id": "22f2e5de-814b-48b5-a114-9b4bc451e9dc",
                "category": {
                        "id": "7887308f-7b7c-4690-88af-b1d021b1e39f"
                }
        },
        {
                "name": "name 1399072120",
                "fullImageUrl": "http://image",
                "publish": false,
                "special": false,
                "id": "93df80a4-262f-4d2d-a3ef-a25f83059680",
                "category": {
                        "id": "82cec2ad-700c-4dd8-8f94-12797463700a"
                }
        },
        {
                "name": "name 2105342212",
```

-continued

| CODE APPENDIX |
|---|

```
                "fullImageUrl": "http://image",
                "publish": false,
                "special": true,
                "id": "5e0062ae-fc01-4e60-afe6-09ace4c15e21",
                "category": {
                        "id": "da103920-edbb-4fbc-bcec-9f6086278284"
                }
        },
        {
                "name": "name 1170107362",
                "publish": false,
                "special": false,
                "id": "68c10fb9-226b-4b38-8c0b-d2a485a5a3b9",
                "category": {
                        "id": "41703a9c-e203-45ab-8635-7ec230336890"
                }
        },
        {
                "name": "name 974420088",
                "fullImageUrl": "http://image",
                "publish": false,
                "special": true,
                "id": "6d011566-ca02-456c-882b-85ad54f3696f",
                "category": {
                        "id": "4f27921f-6c21-4a4f-8892-8dbadd7de804"
                }
        },
        {
                "name": "name 1900261394",
                "publish": false,
                "special": false,
                "id": "01643627-c1e0-4035-91d1-235372a85644",
                "category": {
                        "id": "32dc54f0-6b1b-44b1-99e1-a822b5d99c97"
                }
        },
        {
                "name": "name 747209554",
                "publish": false,
                "special": true,
                "id": "0a872950-f222-4d56-9cb4-9ccda0e1a078",
                "category": {
                        "id": "bb0070d4-3cc5-41a2-9b8c-a53b5a4fa901"
                }
        },
        {
                "name": "name 1182621381",
                "publish": false,
                "special": true,
                "id": "2dcdfc4f-3a22-46c3-8889-d8bc4dfae98d",
                "category": {
                        "id": "fb677dd6-7dc0-486e-aed1-53945795e627"
                }
        }
], "layouts": [
        {
                "productId": "68c10fb9-226b-4b38-8c0b-d2a485a5a3b9",
                "size": {
                        "width": 1,
                        "height": 1
                },
                "position": 6
        },
        {
                "productId": "22f2e5de-814b-48b5-a114-9b4bc451e9dc",
                "size": {
                        "width": 1,
                        "height": 1
                },
                "position": 2
        },
        {
                "productId": "6d011566-ca02-456c-882b-85ad54f3696f",
                "size": {
                        "width": 2,
                        "height": 2
                },
```

| CODE APPENDIX |
| --- |

```
                "position": 12
            },
            {
                "productId": "5e0062ae-fc01-4e60-afe6-09ace4c15e21",
                "size": {
                    "width": 2,
                    "height": 2
                },
                "position": 4
            },
            {
                "productId": "ba7757cc-bc5c-4291-8242-c47e06ca1716",
                "size": {
                    "width": 1,
                    "height": 1
                },
                "position": 1
            },
            {
                "productId": "0a872950-f222-4d56-9cb4-9ccda0e1a078",
                "size": {
                    "width": 1,
                    "height": 1
                },
                "position": 11
            },
            {
                "productId": "2dcdfc4f-3a22-46c3-8889-d8bc4dfae98d",
                "size": {
                    "width": 1,
                    "height": 1
                },
                "position": 14
            },
            {
                "productId": "93df80a4-262f-4d2d-a3ef-a25f83059680",
                "size": {
                    "width": 1,
                    "height": 2
                },
                "position": 3
            },
            {
                "productId": "20d79564-b07f-459e-b1de-9f5767292601",
                "size": {
                    "width": 1,
                    "height": 1
                },
                "position": 0
            },
            {
                "productId": "01643627-c1e0-4035-91d1-235372a85644",
                "size": {
                    "width": 1,
                    "height": 1
                },
                "position": 10
            }
        ]}
```

What is claimed is:

1. A method of formatting an electronic menu to be output to a display of an electronic device, the method comprising:

defining a virtual grid-based layout including rows and columns that together define a plurality of grid cells;

receiving input identifying a plurality of items to be included in the electronic menu, each said item having associated length and width dimensions corresponding to a number of grid cells, at least some of said items being indicated for inclusion in the electronic menu;

automatically and programmatically arranging said items indicated for inclusion in the electronic menu in the grid cells of the grid-based layout in a manner that minimizes the number of unused grid cells in the virtual grid-based layout;

storing, to a file on a non-transitory computer readable storage medium, a representation of the layout, following said arranging, the representation of the layout corresponding to the formatted electronic menu; and making the file available to the electronic device in enabling the formatted electronic menu to be displayed on the display of the electronic device, wherein the method further comprises:

for at least some of the items, maintaining a record of a time period over which the respective items are to be offered for inclusion in the electronic menu;

determining whether a time period has expired; and in response to a determination that a time period has expired, reformatting the electronic menu so as to exclude from the grid-based layout an entry for the associated item.

2. The method of claim 1, wherein the formatted electronic menu includes a hierarchical arrangement of sections and sub-sections.

3. The method of claim 2, wherein items in a sub-section cannot be reordered as a result of the arranging.

4. The method of claim 2, further comprising defining different grid-based layouts for different sections.

5. The method of claim 1, wherein the arranging preserves to the maximum extent possible the order of the items in the received input.

6. The method of claim 1, wherein the received input further provides content information for each said item, the content information including a name, description, and price for the respective item.

7. The method of claim 6, wherein the content information for each said item further includes an optional image field that specifies a location for an image file to be displayed with the respective item.

8. The method of claim 7, wherein one of the length and width dimensions associated with each said item having a valid entry in its optional image field is increased.

9. The method of claim 6, wherein the received input further indicates that at least one of the items is to be displayed as a highlighted feature, the length and width dimensions associated with each said highlighted feature both being increased.

10. The method of claim 1, further comprising:

maintaining an inventory value for at least some of the items;

determining whether an inventory value drops below a predetermined threshold; and in response to a determination that an inventory value drops below the predetermined threshold, reformatting the electronic menu so as to exclude from the grid-based layout an entry for the associated item.

11. A method of formatting an electronic menu to be output to a display of an electronic device, the method comprising:

defining a virtual grid-based layout including rows and columns that together define a plurality of grid cells;

receiving input identifying a plurality of items to be included in the electronic menu, each said item having associated length and width dimensions corresponding to a number of grid cells, at least some of said items being indicated for inclusion in the electronic menu;

automatically and programmatically arranging said items indicated for inclusion in the electronic menu in the grid cells of the grid-based layout in a manner that minimizes the number of unused grid cells in the virtual grid-based layout;

storing, to a file on a non-transitory computer readable storage medium, a representation of the layout, following said arranging, the representation of the layout corresponding to the formatted electronic menu;

making the file available to the electronic device in enabling the formatted electronic menu to be displayed on the display of the electronic device;

adding to a source set a representation of each of the items identified by the received input;

defining a state object having a predetermined number of rows and a number of columns equal to the number of columns in the grid-based layout that together define a plurality of state object cells, the state object cells having the same size and shape as the grid cells;

(a) determining how many state object cells are unused in the first row of the state object;

(b) removing elements from the source set and adding the removed elements to an insertion set while the total width of the elements added to the insertion set, as measured in cells, is less than the number of unused cells in the first row of the state object;

(c) attempting to reorder the elements in the insertion set to fill the unused cells in the first row of the state object;

(d) in response to a valid order being determined in (c), placing the reordered elements in the state object in this reordered order until all unused cells are filled and returning to the source set in their initial order any unused elements remaining in the insertion set;

(e) in response to no valid order being determined in (c), searching for an appropriately-sized element from among the first predetermined number of elements in the source set;

(f) in response to an appropriately-sized element being found in (e), removing the appropriately-sized element from the source set and adding it to the insertion set, reordering the elements in the insertion set to fill the unused cells in the first row of the state object, and placing the reordered elements in the state object in this reordered order until all unused cells are filled and returning to the source set in their initial order any unused elements remaining in the insertion set; and (g) if the source set is not empty, designating the row following the first row of the state object as the new first row of the state object and repeating (a)-(f), but otherwise defining the grid-based layout in accordance with the state object.

12. The method of claim 11, further comprising inserting preselected filler material into any unused grid cells.

13. The method of claim 11, wherein the predetermined number of elements searchable in (e) is less than the number of elements in the source set.

14. A method of formatting an electronic menu to be output to a display of an electronic device, the method comprising:

defining a virtual grid-based layout including rows and columns that together define a plurality of grid cells;

receiving input identifying a plurality of items to be included in the electronic menu, each said item having associated length and width dimensions corresponding to a number of grid cells, at least some of said items being indicated for inclusion in the electronic menu;

automatically and programmatically arranging said items indicated for inclusion in the electronic menu in the grid cells of the grid-based layout in a manner that minimizes the number of unused grid cells in the virtual grid-based layout;

storing, to a file on a non-transitory computer readable storage medium, a representation of the layout, following said arranging, the representation of the layout corresponding to the formatted electronic menu;

making the file available to the electronic device in enabling the formatted electronic menu to be displayed on the display of the electronic device;

adding to a source set a representation of each of the items identified by the received input, the elements in the source set being ordered in accordance with a desired display order for the corresponding items;

dividing the grid-based layout into a plurality of segments, each said segment including at least two rows and all columns in these rows that together define segment cells;
(a) starting with the first segment, and starting at the beginning of the source set, identifying elements in the source set whose total cell space is less than or equal to the number of cells in the segment, and removing those identified elements from the source set;
(b) selecting a segment layout from a pre-generated set of possible segment layouts for the identified elements, based on the combination of dimensions of the items associated with identified elements, as represented in cells;
(c) laying out the items in the first segment in accordance with the selected segment layout; and
(d) if the source set is not empty, designating the segment following the first segment as the new first segment and repeating (a)-(c), but otherwise defining the grid-based layout in accordance with the laid-out segments.

15. The method of claim 14, wherein there are two rows in each segment.

16. The method of claim 14, wherein the number of rows in each segment is equal to maximum size, in cells, of any item.

17. The method of claim 1, wherein the arranging comprises:
adding to a source set a representation of each of the items identified by the received input, the elements in the source set being ordered in accordance with a desired display order for the corresponding items;
dividing the grid-based layout into a plurality of segments, each said segment including a number of rows that is at least one row greater than a maximum size of the elements, as expressed in cells, and all columns in these rows, so that the segment rows and segment columns collectively define segment cells;
(a) starting with a first segment, determining how many segment cells are unused in its last row and, in response to a determination that there are no unused segment cells in its last row, adding the first segment to the grid-based layout and making the next segment the first segment;
(b) starting with the first segment, and starting at the beginning of the source set, identifying elements in the source set whose total cell space is less than or equal to the number of unused cells in the first row of the first segment, and removing those identified elements from the source set;
(c) attempting to first reorder and if necessary then rotate at least some of the identified elements to fill the unused cells in the first row of the first segment;
(d) in response to a successful attempt in (c), placing the reordered and/or rotated elements in the first segment in this reordered and/or rotated order and returning to the source set in their initial order any unplaced identified elements;
(e) in response to an unsuccessful attempt in (c), searching the source set for an element from among the first predetermined number of elements in the source set that is appropriately-sized and/or re-orientable to be appropriately-sized to fill unused cells in the first row of the first segment;
(f) in response to an appropriately-sized and/or re-orientable element being found in (e), removing the appropriately-sized element from the source set and considering it one of the identified elements, attempting to first reorder and if necessary then rotate at least some of the identified elements to fill the unused cells in the first row of the first segment, placing the reordered and/or rotated elements in the first segment in this reordered and/or rotated order and returning to the source set in their initial order any unplaced identified elements; and
(g) if the source set is not empty, designating the row following the first row of the first segment as the new first row of the first segment and repeating (a)-(f), but otherwise defining the grid-based layout in accordance with the first segment.

18. A computing device, comprising:
processing resources including at least one processor and a memory;
a non-transitory computer readable storage medium; and
an input channel configured to receive input identifying a plurality of items to be included in an electronic menu, each said item having associated length and width dimensions corresponding to a number of grid cells, at least some of said items being indicated for inclusion in the electronic menu;
wherein the processing resources are controllable to format the electronic menu using received input by executing instructions for at least:
defining a virtual grid-based layout including rows and columns that together define a plurality of grid cells;
automatically and programmatically arranging said items indicated for inclusion in the electronic menu in the grid cells of the grid-based layout in a manner that minimizes the number of unused grid cells in the virtual grid-based layout;
storing, to a file on the non-transitory computer readable storage medium, a representation of the layout, following said arranging, the representation of the layout corresponding to the formatted electronic menu; and
making the file available to electronic devices in order to in turn enable the electronic devices to display and enable user interaction with the formatted electronic menu;
for at least some of the items, maintaining a record of a time period over which the respective items are to be offered for inclusion in the electronic menu;
determining whether a time period has expired; and
in response to a determination that a time period has expired, reformatting the electronic menu so as to exclude from the grid-based layout an entry for the associated item.

19. A non-transitory computer readable storage medium tangibly storing instructions that, when executed, perform the method of claim 1.

* * * * *